United States Patent
Ishino et al.

(10) Patent No.: US 9,374,496 B1
(45) Date of Patent: Jun. 21, 2016

(54) FORM PROVIDING APPARATUS, FORM PROCESSING SYSTEM, FORM PROCESSING METHOD AND COMPUTER READABLE MEDIUM

(71) Applicant: FUJI XEROX CO., LTD., Tokyo (JP)

(72) Inventors: Shigeki Ishino, Yokohama (JP);
Takahiro Okayasu, Sagamihara (JP);
Shinichiro Yamamoto, Kawasaki (JP);
Teppei Aoki, Kamakura (JP);
Masamune Oshitani, Tokyo (JP);
Russell Neville, Portland, OR (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/656,823

(22) Filed: Mar. 13, 2015

(30) Foreign Application Priority Data

Jan. 29, 2015 (JP) ................................ 2015-015628

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/32* | (2006.01) | |
| *H04N 1/00* | (2006.01) | |

(52) U.S. Cl.
CPC ....... *H04N 1/32133* (2013.01); *H04N 1/00244* (2013.01); *H04N 2201/0094* (2013.01)

(58) Field of Classification Search
USPC ................................................ 358/1.1–1.18
See application file for complete search history.

(56) References Cited

U.S. PATENT DOCUMENTS

| | | | |
|---|---|---|---|
| 4,937,439 A | 6/1990 | Wanninger et al. | |
| 8,145,574 B1 * | 3/2012 | Hancock et al. | .............. 705/303 |
| 8,150,156 B2 * | 4/2012 | Geva et al. | .................... 382/175 |
| 2004/0174562 A1 | 9/2004 | Edwards | |
| 2010/0281355 A1 | 11/2010 | White et al. | |

FOREIGN PATENT DOCUMENTS

| | | |
|---|---|---|
| JP | 2005-262754 A | 9/2005 |
| JP | 2006-173884 A | 6/2006 |

OTHER PUBLICATIONS

Office Action issued on Apr. 13, 2016, by IP Australia in counterpart Australian Application No. 2015201639.

* cited by examiner

*Primary Examiner* — Douglas Tran
(74) *Attorney, Agent, or Firm* — Sughrue Mion, PLLC

(57) ABSTRACT

A fill-in form providing device includes: a transmission section that transmits information of a user interface for a fill-in form to an image forming device in response to an acquisition request to acquire the user interface issued from the image forming device; a printing instruction section that instructs the image forming device to print a fill-in form associated with the user interface for the fill-in form, in response to a printing request to print the fill-in form based on an operation of the user interface for the fill-in form in the image forming device; a reception section that receives image data, which is generated through image reading based on the operation of the user interface for the fill-in form in the image forming device, and storage destination information; and a storage processing section that executes processing for storing the image data in the storage destination.

23 Claims, 13 Drawing Sheets

(CONT.)

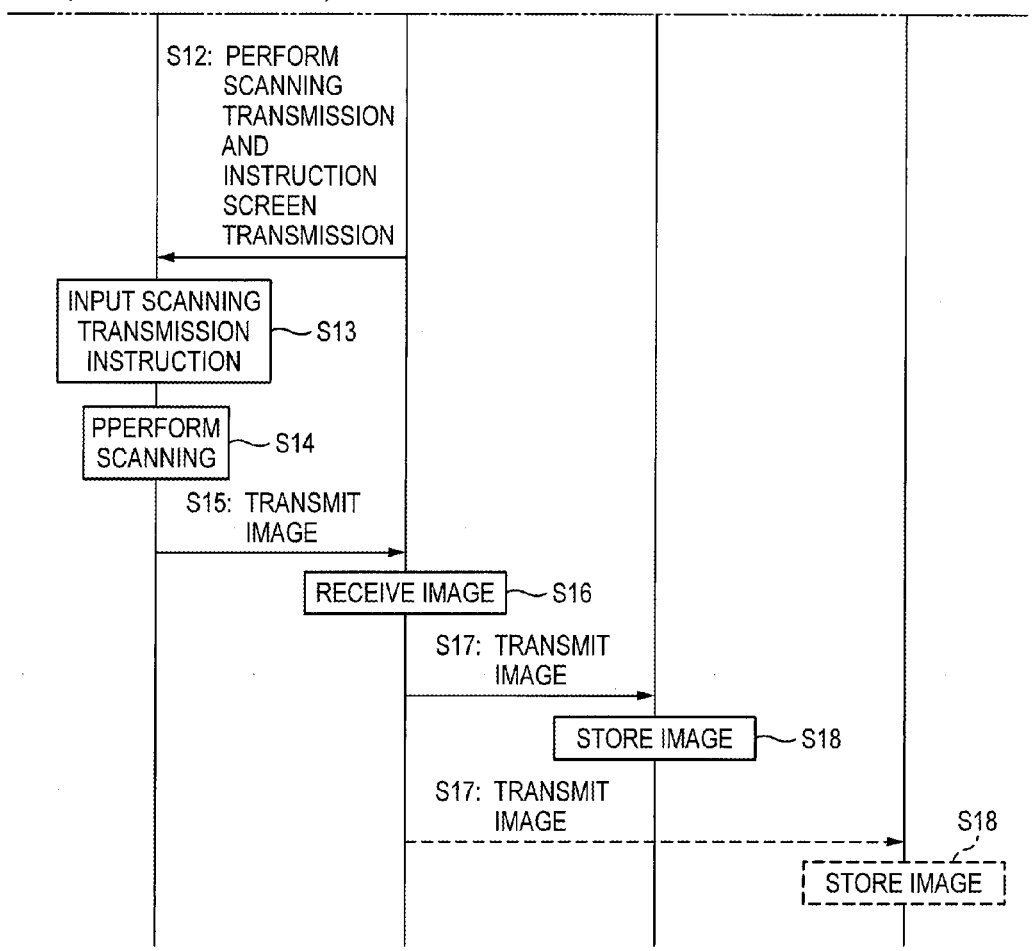

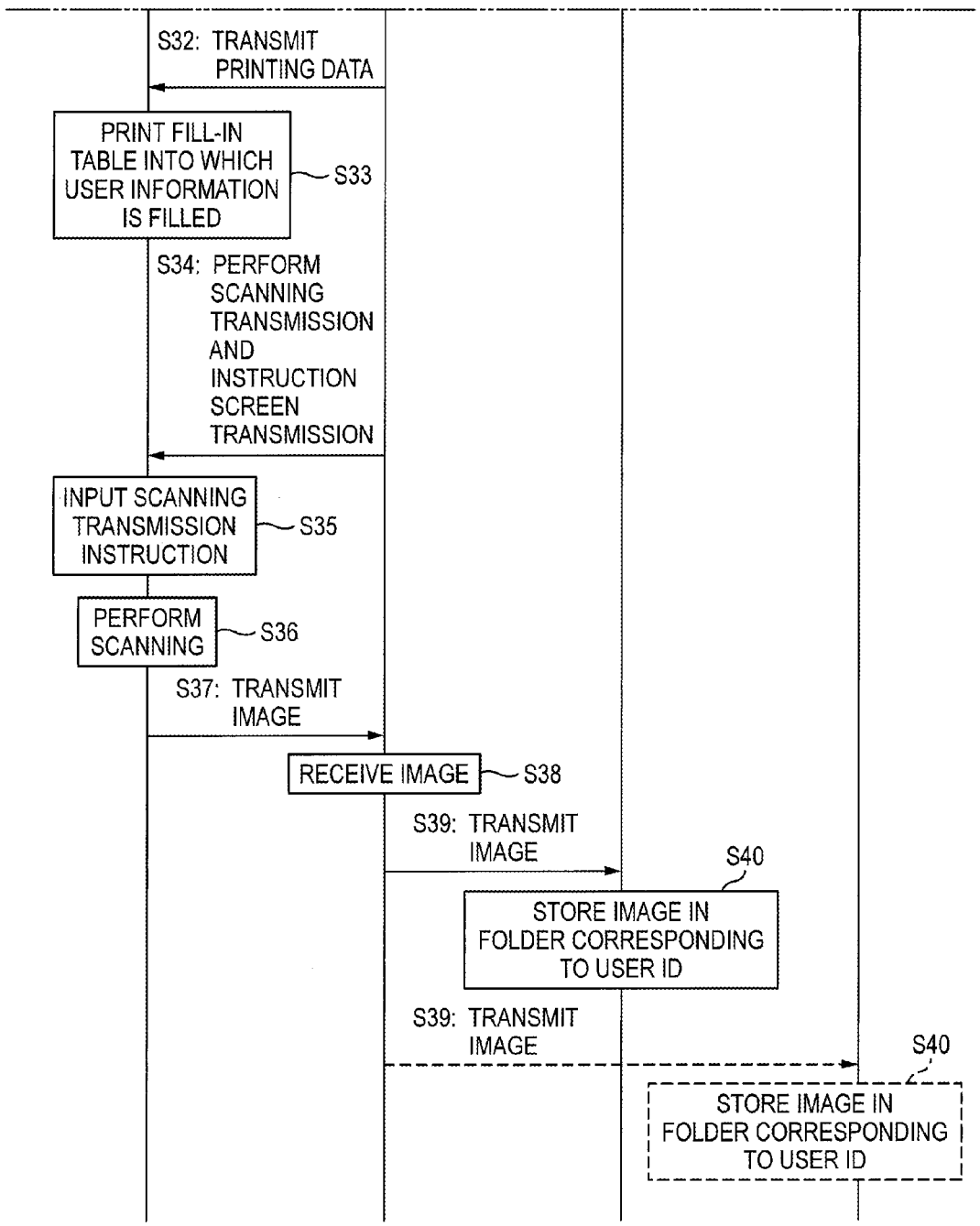

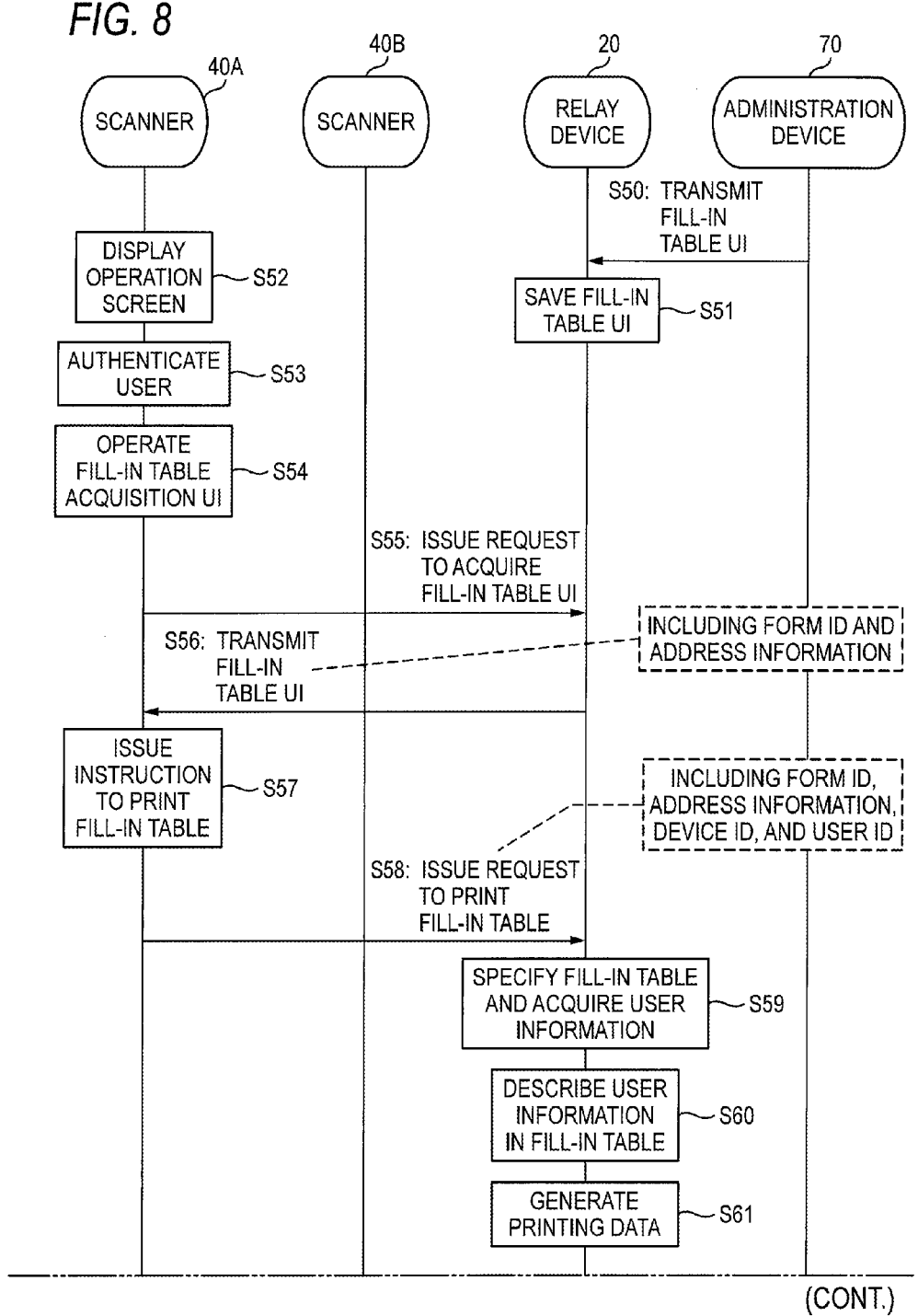

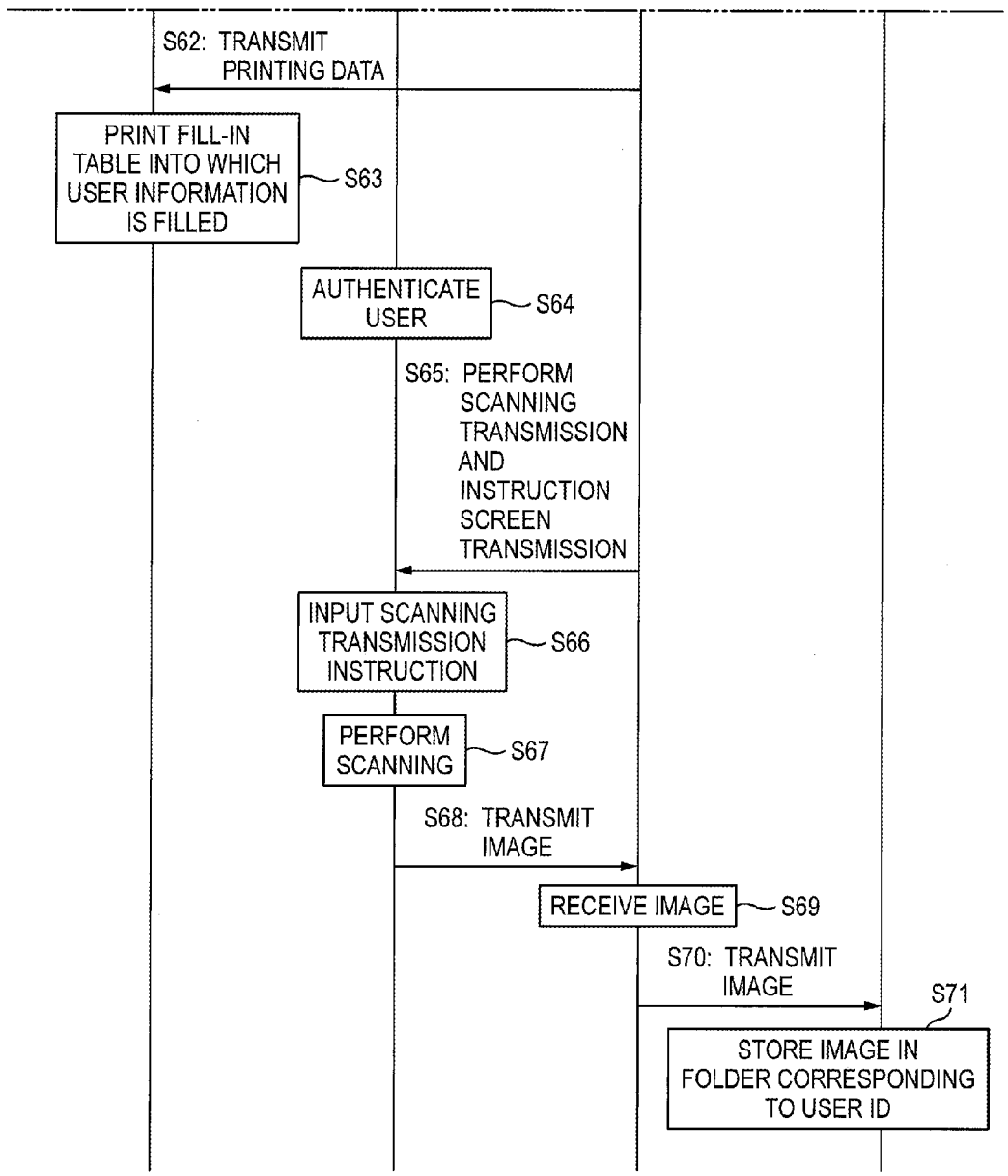

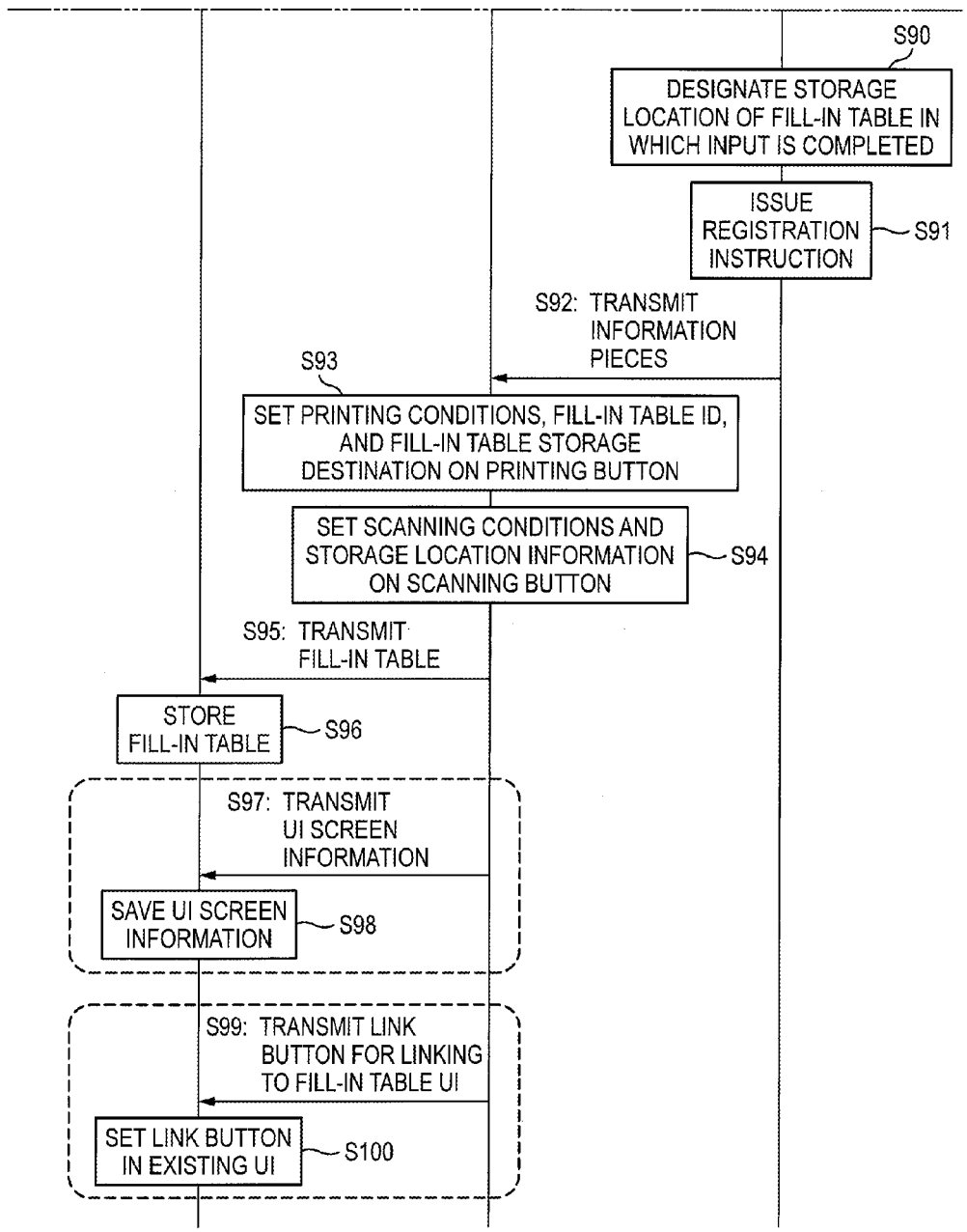

US 9,374,496 B1

FORM PROVIDING APPARATUS, FORM PROCESSING SYSTEM, FORM PROCESSING METHOD AND COMPUTER READABLE MEDIUM

CROSS-REFERENCE TO RELATED APPLICATIONS

This application is based on and claims priority under 35 USC 119 from Japanese Patent Application No. 2015-015628 filed on Jan. 29, 2015.

BACKGROUND

1. Technical Field

The present invention relates a form providing apparatus, a form processing system, a form processing method and a computer readable medium.

2. Related Art

A technology of printing processing contents at the time of scanning (image reading) together with a processing target document is known.

SUMMARY

An aspect of the present invention provides a fill-in form providing device including: a transmission section that transmits information of a user interface for a fill-in form to an image forming device of an acquisition request source in response to an acquisition request to acquire the user interface for the fill-in form issued from the image forming device; a printing instruction section that instructs the image forming device of a printing request source to print a fill-in form associated with the user interface for the fill-in form, in response to a printing request to print the fill-in form based on an operation of the user interface for the fill-in form in the image forming device; a reception section that receives image data, which is generated through image reading based on the operation of the user interface for the fill-in form in the image forming device, and storage destination information which represents a storage destination of the image data; and a storage processing section that executes processing for storing the image data in the storage destination.

BRIEF DESCRIPTION OF THE DRAWINGS

Exemplary embodiment(s) of the present invention will be described in detail based on the following figures, wherein

FIG. 8 is a sequence diagram illustrating processing according to a third example.

DETAILED DESCRIPTION

Figure 1:
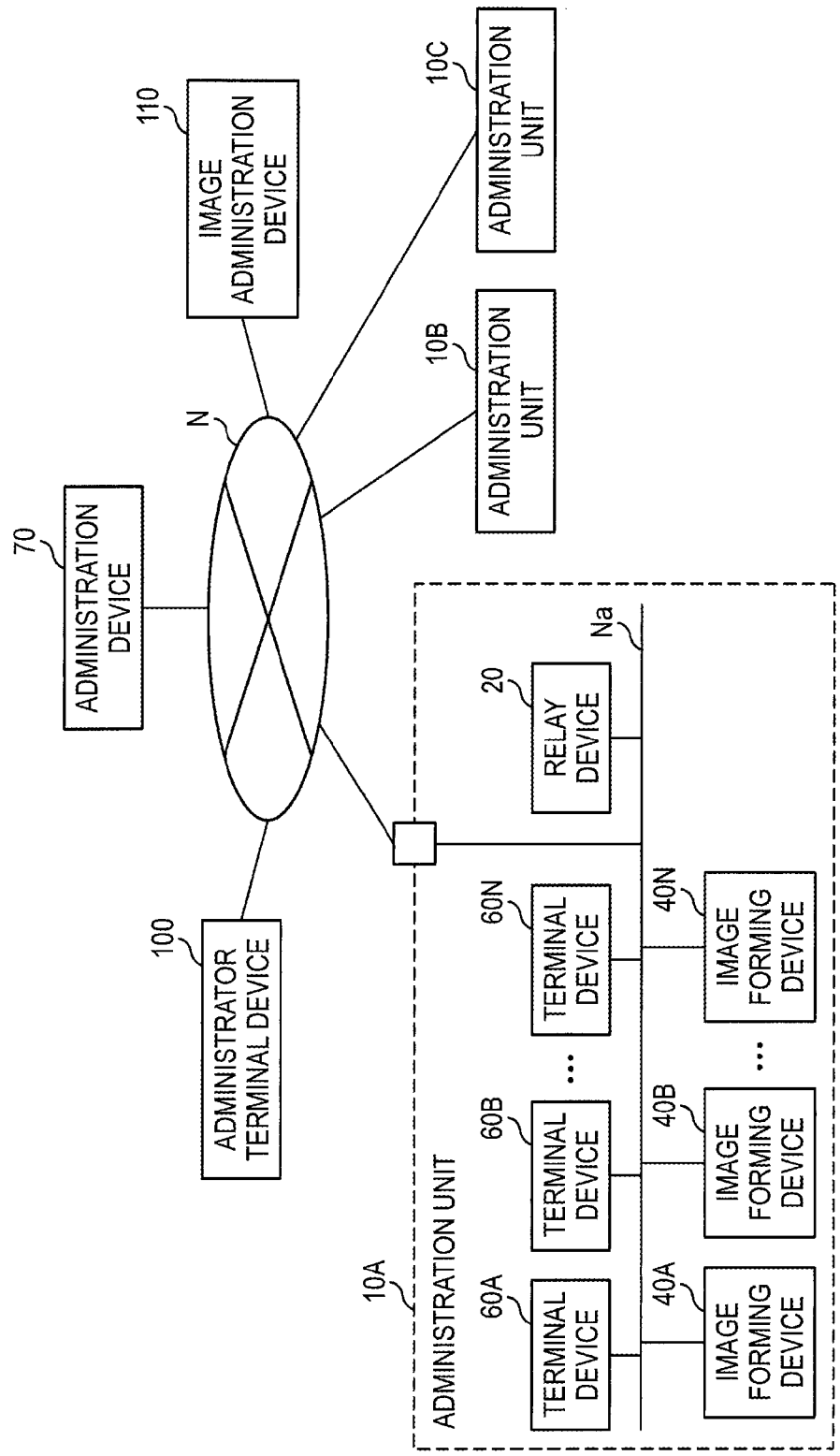
FIG. 1 is a block diagram illustrating an example of a device administration system according to an embodiment of the present invention.

FIG. 1 shows an example of a device administration system according to an embodiment of the present invention. The device administration system includes single or plural administration units 10 (for example, administration units 10A, 10B, and 10C), and an administration device 70 which is provided outside the administration units 10. It should be noted that if it is not necessary to distinguish the administration units 10A, 10B, and 10C, those are referred to as "administration units 10". The plural administration units 10 and the administration device 70 are connected to a communication path N. The communication path N is constituted of a network such as the Internet. Further, other devices such as an administrator terminal device 100 and an image administration device 110 may be connected to the communication path N. In an example shown in FIG. 1, the three administration units 10 are included in the device administration system, but this configuration is just an example. For example, a single administration unit 10 or four or more administration units 10 may be included in the device administration system. Further, plural administrator terminal devices 100 and plural image administration devices 110 may be connected to the communication path N. A server such as a printing server may be connected to the communication path N.

The administration units 10 are a collection of computers and other devices. The collection may be an organization of users using such devices. Such devices have a function of performing data communication through a communication path Na such as a local area network (LAN) or an intranet. The administration unit 10 is, for example, a single office, factory, home, or the like.

The administration unit 10 includes a relay device 20, a single or plural image forming devices 40 (for example, image forming devices 40A, 40B, . . . , and 40N), and a single or plural terminal devices 60 (for example, terminal devices 60A, 60B, . . . , and 60N). In addition, if it is not necessary to distinguish image forming devices 40A, 40B, . . . , and 40N, those are referred to as "image forming devices 40". The plural image forming devices 40 are connected to the communication path Na. In the example shown in FIG. 1, plural image forming devices 40 are included in the administration unit 10, but this configuration is just an example. For example, a single image forming device 40 may be included in the administration unit 10. Further, if it is not necessary to distinguish terminal devices 60A, 60B, . . . , and 60N, those are referred to as "terminal devices 60". The plural terminal devices 60 are connected to the communication path Na. In the example shown in FIG. 1, plural terminal devices 60 are included in the administration unit 10, but this configuration is just an example. For example, a single terminal device 60 may be included in the administration unit 10.

The communication path Na may be either a wired system or a wireless system, and may be a combination of both of those. The communication path Na is connected to the communication path N through, for example, a firewall, a gateway, or the like.

The image forming device 40 is an example of a device (administration target device) as an administration target of the device administration system. The image forming device 40 is, for example, a printer, a multi-function peripheral (a multi-function device having a copy function, a printer function, a scanner function, and the like), a scanner, a facsimile device, or the like. A device other than the image forming device 40 may correspond to the administration target device.

The terminal device 60 is a device such as a personal computer, a mobile phone, a smartphone, or a tablet terminal. The terminal devices 60 have a function of using the image forming devices 40 through the communication path Na.

The relay device 20 has a function of relaying the external communication path N with the image forming devices 40 and the terminal devices 60 which are included in the administration units 10. The relay device 20 has a function of receiving firmware for each image forming device 40, a device driver such as a printer driver, updated data of a device driver, and the like, from the administration device 70. The device driver is a control program which is used in order for the terminal device 60 to control the administration target device. The printer driver is a control program which is used in order for the terminal device 60 to control the image forming device 40. The relay device 20 stores the firmware programs and the device drivers in order to respectively install the firmware programs and the device drivers in the corresponding image forming devices 40 and terminal devices 60. Further, the relay device 20 may have a function of providing device information to the administration device 70 by collecting the device information which is used to administer the image forming devices 40, from the image forming devices 40 connected to the communication path Na.

By installing a program describing a function of the relay device 20 in any one of the terminal devices 60 connected to the communication path Na, the corresponding terminal device 60 may be used as the relay device 20. However, in the present embodiment, in consideration of robustness of the device itself and operational convenience, the relay device 20 designed as a dedicated device is used. The relay device 20 designed as a dedicated device may have a capability of executing a program which is necessary only for the device administration system. Thus, the hardware performance of the relay device 20 (CPU performance, a memory capacity, and the like) does not have to be so high. The relay device 20 may be constituted of a relatively small and inexpensive device. Further, the relay device 20 does not have to have a function of executing an unspecified program which is not determined in advance. Therefore, it is difficult for failure to occur, and it is not essentially necessary for a user to perform maintenance for the relay device 20, or the maintenance may be performed fewer times. Further, the administration device 70 provides information to a user through the communication path N. Therefore, the relay device 20 does not have to have a UI section (user interface section) such as a display screen or an input device.

The administration device 70 collects device respective information pieces of the image forming devices 40 through the communication path N from the relay device 20 within each administration unit 10, and provides a service to each administration unit 10 by using the device information. The administration device 70 may be a single server device, and may be a system constituted of plural computers like a cloud computing system. As an example of the service provided by the administration device 70, there is a service that provides information pieces (such as usages and states of the image forming devices 40), which are collected from the administration units 10, and secondary information, which can be obtained by analyzing these information pieces, to administrators of the administration units 10. For example, it is assumed that an administrator of a certain administration unit 10 logs into the administration device 70 by using the administrator terminal device 100 and accesses the information of the administration unit 10. It should be noted that the administrator terminal device 100 is a device such as a personal computer, a mobile phone, a smartphone, or a tablet terminal. Further, the administration device 70 may provide one or more services. The services include: administration of charging for use of the image forming devices 40; administration of the remaining amounts of consumables of the image forming devices 40; distribution of the most recent version of the device drivers and firmware; and setting of various kinds of setting information for the image forming devices 40. It is apparent that those are just examples, and the administration device 70 may provide various other services by using the collected information pieces.

The image administration device 110 stores image data in the storage device. For example, the image administration device 110 stores the image data, which is transmitted from the image forming devices 40 and the terminal devices 60.

Figure 2:
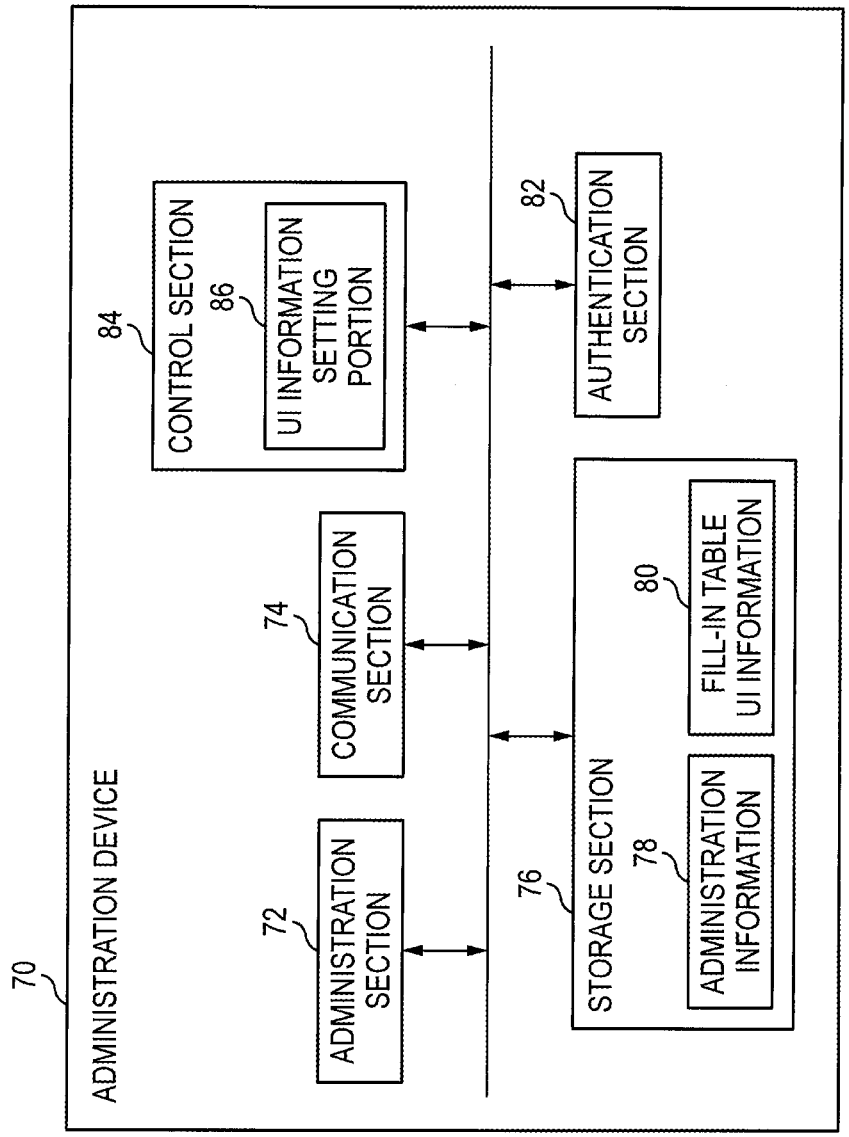
FIG. 2 is a block diagram illustrating an example of an administration device according to the present embodiment.

FIG. 2 shows a configuration of the administration device 70.

The administration section 72 administers the information pieces of the administration units 10. For example, the administration section 72 administers relay device identification information pieces (for example, relay device IDs) for identifying the relay devices 20 of the administration units 10, device information pieces of the image forming devices 40 within the administration units 10, and the like. Further, the administration section 72 may administer the information pieces (such as user IDs of administrators) of administrators of the administration units 10. Such information pieces are stored in a storage section 76. For example, in association with the relay device IDs of the relay devices 20, the following information pieces are stored in the storage section 76: user IDs (administrator IDs) of the administrators who administer the relay devices 20; names (for example, group names) of the administration units 10 provided by the relay devices 20; address information of the relay devices 20; and device information of the image forming devices 40 within the administration units 10. Such information pieces are stored as administration information 78 in the storage section 76. As the administrator ID, for example, an e-mail address of an administrator may be used. The device information includes, for example: device identification information (such as device IDs and device names) for identifying the image forming devices 40; device type information (such as model names) that represents the types of image forming devices 40; usage history information that represents usage histories of the image forming devices 40; operation state information that represents the operation states (such as a normal state and a toner run-out state) of the image forming devices 40; and the like. The usage history information is, for example, information that represents dates and times (such as dates and times of printing operations) when the image forming device 40 is used, the number of outputs at each use (for example, a count value indicating the number of printed sheets), and the like. It is apparent that information other than those may be included in the usage history information.

The communication section 74 is a communication interface which is connected to the communication path N. The communication section 74 has a function of receiving data from other devices and a function of transmitting data to other devices.

The storage section 76 is a storage device such as a hard disk. The storage section 76 stores the administration information 78 and fill-in table UI information 80. The administration information 78 is information which is administered by the administration section 72.

The fill-in table UI information 80 is information which represents a user interface for a fill-in table (a fill-in table UI).

The fill-in table UI is an example of the user interface for a fill-in form. The fill-in table UI is a user interface which is used in the image forming device 40. The fill-in table UI information 80 is associated with UI identification information (for example, an ID for UI) for identifying the fill-in table UI information 80.

The fill-in table is a fill-in form into which information is scheduled to be filled by a user. Examples of the fill-in table include a fill-in form for a questionnaire and a hospital visiting form which is used in a hospital. It is apparent that other fill-in forms may be used. The fill-in table data, which represents the fill-in table, may be stored in the storage section 76 of the administration device 70, or may be stored in an external device other than the administration device 70. In the present embodiment, the fill-in table is printed by the image forming device 40, and information is filled into a fill-in table sheet as printed matter thereof by a user.

Examples of the fill-in table UI information 80 include printing UI information and scanning transmission UI information. The printing UI information is information which represents a printing UI. The scanning transmission UI information is information which represents a scanning transmission UI.

The printing UI is a UI for allowing a user to issue an instruction to print the fill-in table. The printing UI includes a printing instruction button. The printing instruction button is a button for issuing the instruction to print the fill-in table. The printing UI information includes information which represents the printing instruction button.

The printing UI (printing instruction button) is associated with printing conditions information which represents printing conditions of the fill-in table, form identification information (for example, form ID) which is for identifying the fill-in table as a printing target, and form address information which represents an address of a location in which the fill-in table data is stored. Examples of the printing conditions include a printing resolution, a mode (a color mode or a monochrome mode), a paper size, the number of sheets of the fill-in table (number of printed sheets), the number of print copies, and the like. When the printing instruction button is pressed in the image forming device 40, the fill-in table data associated with the printing instruction button is transmitted from the storage location to the image forming device 40, and the fill-in table is printed in the image forming device 40.

The scanning transmission UI is a UI for allowing a user to issue instructions of image reading (scanning) and transmission of the image data which is generated by scanning of an original document. The scanning transmission UI includes a scanning transmission instruction button. The scanning transmission instruction button is a button for instructions to perform scanning and image data transmission. The scanning transmission UI information includes information which represents the scanning transmission instruction button.

The scanning transmission UI (scanning transmission instruction button) is associated with scanning conditions information representing image reading conditions (scanning conditions) of an original document and storage location information representing the storage location of the image data which is generated by scanning. Examples of the scanning conditions include a scanning resolution, a mode (a color mode or a monochrome mode), and the number of sheets subjected to image reading. The number of sheets subjected to image reading is equal to, for example, the number of printed sheets associated with the printing instruction button. In the present embodiment, it is assumed that information is filled into the fill-in table sheet by a user. When the scanning transmission instruction button is pressed in the image forming device 40, the completed fill-in table sheet is scanned by the image forming device 40. Thereby, the completed form image data is generated. The completed form image data is transmitted from the image forming device 40 to the relay device 20. For example, the storage location of the image data may be in the administration device 70, may be in the image administration device 110, and may be in a device other than those. The storage location may be set in advance, and may be set by a user. If the completed form image data is not administered or shared by a device such as a server and is used by a specific user, an e-mail address of the specific user may be used as storage location information. Further, plural storage locations may be set. In this case, information of the plural storage locations is associated with the scanning transmission instruction button.

The fill-in table UI information 80 may be provided for each type of the fill-in tables. When a new fill-in table is created, the fill-in table UI information 80 corresponding to the new fill-in table is created, and the fill-in table UI information 80 is stored in the storage section 76 of the administration device 70. Information as a template for creating the new fill-in table UI information 80 may be stored in the storage section 76.

An authentication section 82 authenticates the user. If the authentication is successful, use of the service is allowed by the administration device 70. For example, access to the administration information 78 is allowed. In the storage section 76, authentication information for each user is stored. Examples of the authentication information include, for example, passwords and user identification information (for example, user IDs) for identifying users. The authentication section 82 receives the authentication information from the terminal device such as the administrator terminal device 100, and performs authentication processing on the basis of the corresponding authentication information and the authentication information stored in the storage section 76. If the authentication is successful (for example, if both authentication information pieces coincide with each other), for example, the administration information 78 associated with the user who is successfully authenticated is transmitted to the corresponding terminal device. In addition, biometric authentication and the like may be used.

A control section 84 controls operations of the respective sections of the administration device 70. For example, under the control of the control section 84, the fill-in table UI information 80 is transmitted to the relay device 20. Thereby, the relay device 20 stores the fill-in table UI information 80. Further, the control section 84 includes a UI information setting portion 86. The UI information setting portion 86 creates new fill-in table UI information, and stores the fill-in table UI information in the storage section 76. It should be noted that the administration device 70 may have a user interface section (UI section) including a display section and an operation section.

Figure 3:
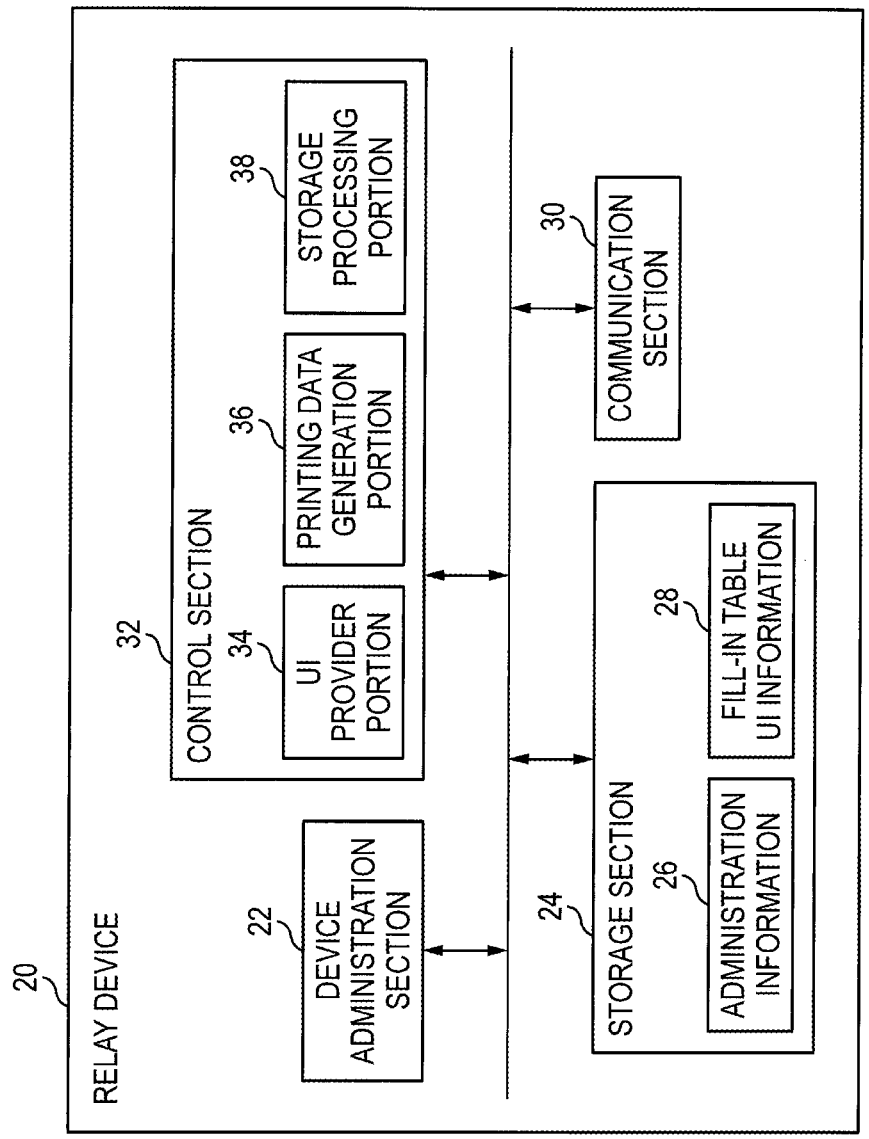
FIG. 3 is a block diagram illustrating an example of a relay device according to the present embodiment.

FIG. 3 shows a configuration of the relay device 20.

A device administration section 22 acquires the device information of the image forming devices 40 connected to the communication path Na and the terminal information of the terminal devices 60 connected to the communication path Na, and administers the device information and the terminal information. The device information and the terminal information are stored as administration information 26 in a storage section 24. The terminal information includes, for example: terminal device identification information (for example, terminal device IDs) for identifying the terminal devices 60; terminal device type information (for example, model names) representing the models of the terminal devices 60; OS information (for example, the names of an OS) representing an OS installed in the terminal devices 60; state information; and the like.

The storage section 24 is a storage device such as a hard disk. The storage section 24 stores administration information 26 and fill-in table UI information 28. The administration information 26 includes the device information and the terminal information. The fill-in table UI information 28 is information transmitted from the administration device 70. For example, when new fill-in table UI information is registered in the administration device 70, the fill-in table UI information is transmitted from the administration device 70 to the relay device 20, and is stored in the storage section 24.

A communication section 30 is a communication interface, and has a function of connection to the communication path N and the communication path Na. The communication section 30 has a function of receiving data from other devices and a function of transmitting data to other devices.

A control section 32 controls operations of the respective sections of the relay device 20. Further, the control section 32 includes a UI provider portion 34, a printing data generation portion 36, and a storage processing portion 38.

The UI provider portion 34 provides the fill-in table UI information 28 to the image forming device 40. For example, the UI provider portion 34 transmits the fill-in table UI information 28 to the image forming device 40 of an acquisition request source, in response to an acquisition request issued from the image forming device 40. The UI provider portion 34 may separately transmit the printing UI information and the scanning transmission UI information to the image forming device 40. For example, the UI provider portion 34 transmits the printing UI information to the image forming device 40 of a first acquisition request source, in response to an acquisition request (first acquisition request) issued from the image forming device 40. Next, if the fill-in table is printed in the image forming device 40, the UI provider portion 34 transmits the scanning transmission UI information to the image forming device 40. Alternatively, the UI provider portion 34 may transmit the scanning transmission UI information to the image forming device 40 of a second acquisition request source, in response to an acquisition request (second acquisition request) issued from the image forming device 40. The UI provider portion 34 may transmit the printing UI information and the scanning transmission UI information to a single image forming device 40, and may respectively transmit the printing UI information and the scanning transmission UI information to image forming devices 40 different from each other. Further, for each fill-in table UI information 28, an image forming device 40 allowed to be used may be set. In this case, the fill-in table UI information 28, which is allowed to be used in the image forming device 40 of the acquisition request source, is transmitted to the corresponding image forming device 40.

When receiving a printing request on the basis of the operation of the fill-in table UI from the image forming device 40, the printing data generation portion 36 acquires the fill-in table data, which is associated with the fill-in table UI, from the storage location in which the corresponding fill-in table data is stored. Then, the printing data generation portion 36 generates printing data. The printing data includes the fill-in table data and information which represents a printing instruction of the fill-in table data. When the fill-in table data is created on the basis of a format corresponding to printing performed by the image forming device 40, the printing data generation portion 36 adds the fill-in table data, which is based on the format, to the printing data. The format is, for example, the portable document format (PDF). If the fill-in table data is not created on the basis of the format corresponding to the printing performed by the image forming device 40, the printing data generation portion 36 converts the format of the fill-in table data into the format corresponding to the printing by using a so-called printer driver. For example, the format conversion is performed if the fill-in table data is created on the basis of a general document format. The printing data is transmitted to the image forming device 40 of a printing request source, under the control of the control section 32. In the image forming device 40, the fill-in table is printed on the basis of the printing data. Thereby, the fill-in table sheet is formed. Information is filled into the fill-in table sheet by a user. When the completed fill-in table sheet is scanned by the image forming device 40, the completed form image data is generated. The completed form image data is transmitted from the image forming device 40 to the relay device 20.

The storage processing portion 38 executes processing of storing the completed form image data, which is generated by the image forming device 40, in the storage location which is set in advance. The fill-in table UI information 28 (scanning transmission UI information) is associated with storage location information which represents the storage location of the completed form image data. The storage processing portion 38 stores the completed form image data in the storage location which is indicated by the storage location information. If the storage location is the relay device 20, the storage processing portion 38 stores the completed form image data in the storage section 24. If the storage location is an external device such as the administration device 70 or the image administration device 110, the storage processing portion 38 transmits the completed form image data to the corresponding external device.

Figure 4:
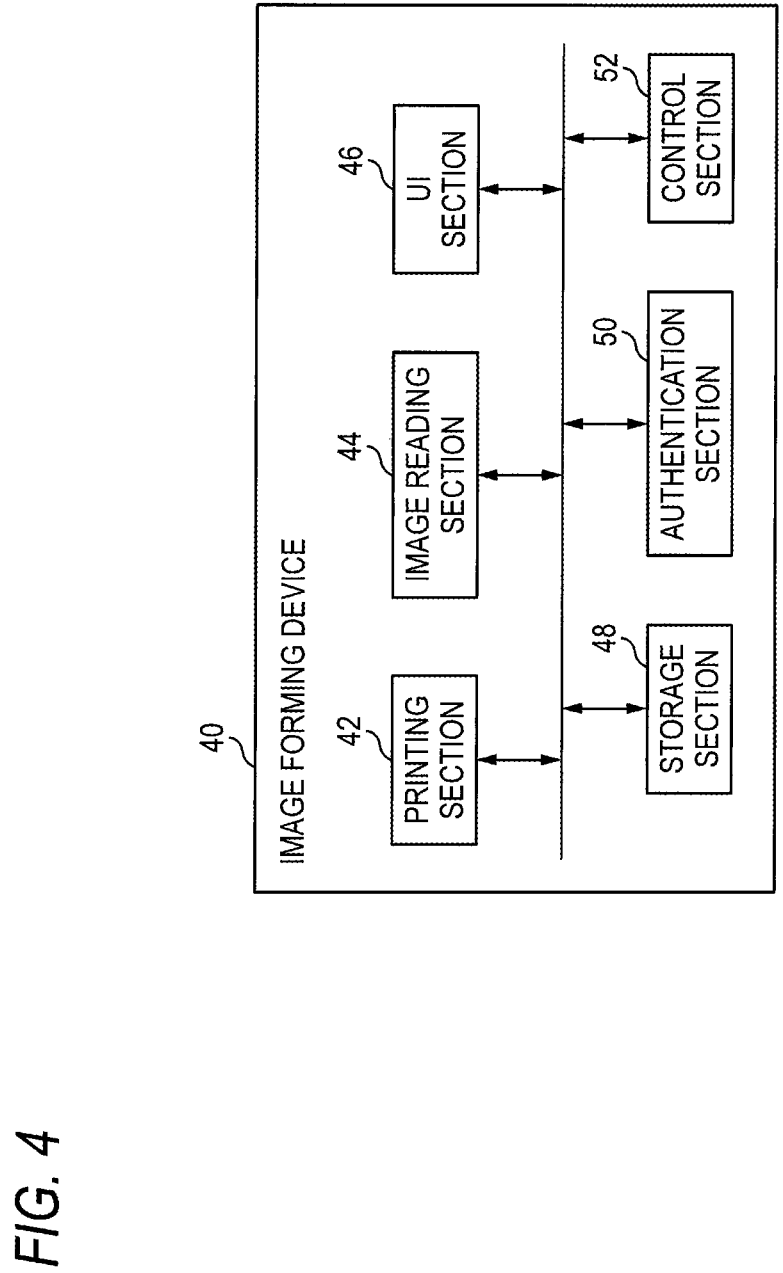
FIG. 4 is a block diagram illustrating an example of an image forming device according to the present embodiment.

FIG. 4 shows a configuration of the image forming device 40.

A printing section 42 forms an image, which is based on the image data, on a recording medium such as paper. An image reading section 44 reads an image of an original document, thereby generating the image data. A UI section 46 is a user interface, and includes a display section and an operation section. The display section is a display device such as a liquid crystal display. The operation section is an input device such as an operation panel. A storage section 48 is a storage device such as a hard disk. An authentication section 50 authenticates a user. For example, the storage section 48 stores authentication information (for example, user IDs and passwords). The authentication section 50 performs authentication processing on the basis of the authentication information, which is input from the UI section 46, and the authentication information which is stored in the storage section 48. If the authentication is successful (for example, if both authentication information pieces coincide with each other), use of the image forming device 40 is allowed. In addition, an authentication card, in which the authentication information is recorded, may be used. In this case, by reading the authentication card through a card reading device connected to the image forming device 40, the authentication information is input to the image forming device 40. Alternatively, biometric authentication may be used. Further, in the authentication card, user information (for example, a user's name, an age, contact information such as an address, a phone number, and an e-mail address, and the like) may be recorded. In this case, by reading the authentication card through the card reading device, such information is input to the image forming device 40. A control section 52 controls operations of the respective sections of the image forming device 40. For example, the control section 52 controls printing performed by the printing section 42 and image reading performed by the image reading section 44. Further, the control section 52 causes a display section of the UI section 46 to display various kinds of information. For example, the control section 52 causes the UI section 46 to display the fill-in table UI.

The image forming device 40 may have both the printing section 42 and the image reading section 44, and may have any one thereof. For example, the image forming device 40 may be configured as a printer having the printing section 42, and may be configured as a scanner having the image reading section 44. Further, the image forming device 40 may have a copying function or a facsimile function.

The storage section 48 stores standard interface information (standard UI information) which is user interface information for the image forming device. The standard UI, which is based on the standard UI information, is displayed on the display section of the UI section 46, under the control of the control section 52.

The standard UI information is screen information for performing an operation of setting of functions (such as an image forming function or an image processing function) provided in the image forming device 40 and performing an operation of execution of such functions. Further, an extended UI display button for issuing an instruction to display an extended UI is provided on the standard UI. The extended UI is, for example, the above-mentioned fill-in table UI. For example, when the extended UI display button is operated, under the control of the control section 52, information, which represents an acquisition request to acquire the fill-in table UI, is transmitted from the image forming device 40 to the relay device 20. In response to the acquisition request, the fill-in table UI information is transmitted from the relay device 20 to the image forming device 40. Thereby, the fill-in table UI is displayed on the display section of the UI section 46. It is apparent that the fill-in table UI information may be transmitted from the relay device 20 to the image forming device 40 regardless of the acquisition request issued from the image forming device 40.

As described above, the fill-in table UI includes the printing UI and the scanning transmission UI. When the printing UI is displayed on the UI section 46, a user issues a printing instruction through the UI section 46, and then data for fill-in is transmitted to the image forming device 40, and the fill-in table is printed in the image forming device 40. Further, when the scanning transmission UI is displayed on the UI section 46, a user issues a scanning transmission instruction through the UI section 46, and then an original document is scanned, thereby generating image data. The image data is stored in the storage location.

Figure 5A:
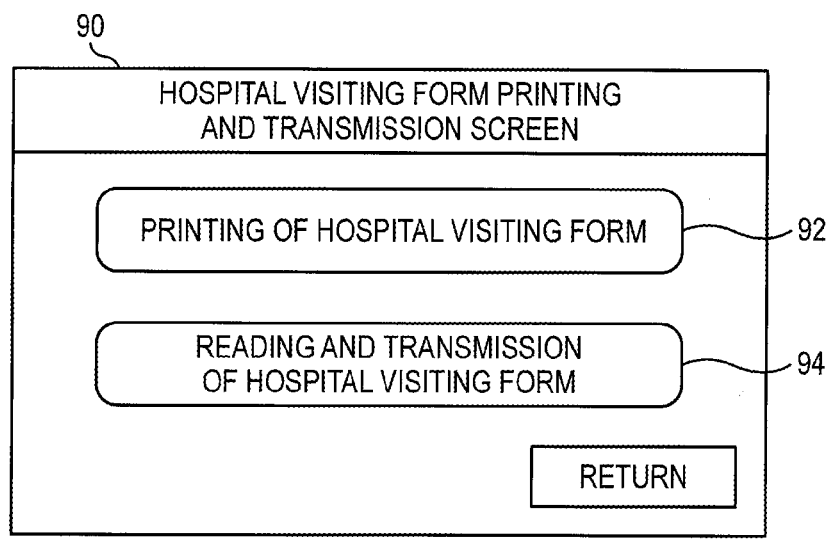
FIGS. 5A and 5B are diagrams illustrating an example of a user interface for a fill-in table.
Figure 5B:
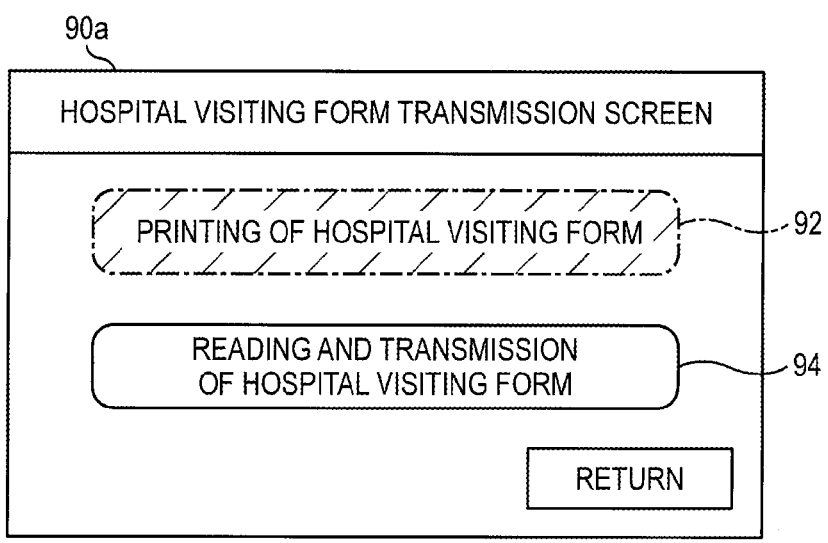

FIGS. 5A and 5B show an example of a fill-in table UI. The fill-in table UI 90 is, for example, a UI for a hospital visiting form which is used in a hospital. For example, the image forming device 40 is provided in a hospital reception, and the fill-in table UI 90 is displayed on the UI section 46 of the image forming device 40. The hospital visiting form is an example of the fill-in table (fill-in form). The hospital visiting form is printed by the image forming device 40. Thereby, a hospital visiting form sheet is formed. For example, information about a patient is filled into the hospital visiting form sheet. The information about a patient includes, for example, a patient's name, an age, contact information such as an address, a phone number, and an e-mail address, symptoms, names of medicines the patient is taking, information representing presence of allergies, and the like. Such information is filled into the hospital visiting form sheet by, for example, the patient himself or herself. The hospital visiting form sheet may be one type of a questionnaire used in a hospital.

As shown in FIG. 5A, the fill-in table UI 90 includes a printing instruction button 92 and a scanning transmission instruction button 94.

The printing instruction button 92 is a button for assisting a user to issue an instruction to print the hospital visiting form. The printing instruction button 92 is associated with a form ID, form address information, and printing conditions information. The form ID is for identifying the hospital visiting form. The form address information represents an address of the location in which data of the hospital visiting form is stored. The printing conditions information represents printing conditions of the hospital visiting form. Examples of the printing conditions include a printing resolution, a mode (color mode or monochrome mode), a paper size, the number of sheets of the hospital visiting form (number of printed sheets), the number of print copies, and the like. When a user presses the printing instruction button 92, information, which represents a printing request to print the hospital visiting form, is transmitted from the image forming device 40 to the relay device 20. The relay device 20 acquires the hospital visiting form data corresponding to the form ID from the storage location which is indicated by the form address information, and generates the printing data including the hospital visiting form data. The printing data is transmitted to the image forming device 40, and printing based on the printing data is executed by the printing section 42. At this time, the printing section 42 prints the hospital visiting form, in accordance with the printing conditions associated with the printing instruction button 92. Thereby, a hospital visiting form sheet is formed. The information about a patient is filled into the hospital visiting form sheet.

The scanning transmission instruction button 94 is associated with the scanning conditions information which represents the scanning conditions and the storage location information which represents the storage location of the image data. The scanning conditions include, for example, a scanning resolution, a mode (color mode or monochrome mode), and the number of sheets subjected to image reading. The number of sheets subjected to image reading is equal to, for example, the number of sheets (number of printed sheets) of the hospital visiting form associated with the printing instruction button 92.

The completed hospital visiting form sheet, into which patient information is filled, is set on the image reading section 44 of the image forming device 40. Thereafter, when a user presses the scanning transmission instruction button 94, the completed hospital visiting form sheet is scanned by the image reading section 44. At this time, the scanning is performed in accordance with the scanning conditions associated with the scanning transmission instruction button 94. Thereby, the completed form image data is generated. The completed form image data is stored in the storage location indicated by the storage location information associated with the scanning transmission instruction button 94.

If the image forming device 40 has an automatic document feeder, it is assumed that, after setting all the pages of the completed hospital visiting form sheet in the automatic document feeder, a user presses the scanning transmission instruction button 94. In this case, images of sheets of the original document (completed hospital visiting form sheet) are automatically read. If the number of read sheets is not equal to the number of sheets associated with the scanning transmission instruction button 94, the control section 52 of the image forming device 40 may output warning information. For example, a message to the effect that the numbers of sheets are not equal is displayed on the display section of the UI section 46. In such a manner, a user's checking may be requested. It should be noted that this processing may be executed by the relay device 20. For example, the image forming device 40 transmits the information, which represents the number of sheets actually read by the corresponding image forming device 40, and information, which represents the number of sheets associated with the scanning transmission instruction button 94, to the relay device 20. When such numbers of sheets are not equal, the control section 32 of the relay device 20 transmits warning information to the image forming device 40. Thereby, a message to the effect that the numbers of sheets are not equal is displayed on the UI section 46 of the image forming device 40.

If the image forming device 40 has no automatic document feeder, it is necessary for a user to manually exchange the original document and to perform scanning. In this case, at a stage where the number of sheets of the scanned original document is equal to the number of sheets associated with the scanning transmission instruction button 94, the completed form image data may be collectively transmitted to the storage location.

When the hospital visiting form is completely printed, an operation of the printing instruction button 92 may be disallowed. FIG. 5B shows the completely printed fill-in table UI 90a. In the fill-in table UI 90a, the operation of the printing instruction button 92 is disallowed, and an operation of the scanning transmission instruction button 94 is allowed. Thereby, an operation to be executed subsequently is clarified for the user, and thus erroneous operations are prevented from being performed or are made less likely to be performed. After completion of printing, the printing instruction is not necessary. Therefore, by not displaying the printing instruction button 92 or disallowing use of the printing instruction button 92, scanning to be executed subsequently is executed as scheduled.

For example, when the hospital visiting form is completely printed, the control section 52 of the image forming device 40 causes the display section of the UI section 46 to display the fill-in table UI 90a instead of the fill-in table UI 90.

As another example, when the hospital visiting form is completely printed, the control section 52 of the image forming device 40 transmits information, which represents the completion of the printing, to the relay device 20. When receiving the information which represents the completion of the printing, the control section 32 of the relay device 20 transmits the information of the fill-in table UI 90a to the image forming device 40. The control section 52 of the image forming device 40 causes the UI section 46 to display the fill-in table UI 90a.

As yet another example, when the user authentication is performed in the image forming device 40, the following processing may be executed. When the hospital visiting form is completely printed, the control section 52 of the image forming device 40 transmits printing completion information and a user ID to the relay device 20. The printing completion information represents a state where the hospital visiting form is completely printed. In the storage section 24 of the relay device 20, the printing completion information and the user ID are stored in association with each other. When the user logs into the image forming device 40, the control section 52 of the image forming device 40 transmits the user ID to the relay device 20. When the printing completion information associated with the user ID is stored in the storage section 24, the control section 32 of the relay device 20 transmits the information of the fill-in table UI 90a to the image forming device 40. Thereby, the fill-in table UI 90a is displayed on the UI section 46 of the image forming device 40. It is assumed that, after the hospital visiting form is printed, information about a patient is filled into the hospital visiting form sheet. For the filling in, some time is necessary. After the hospital visiting form is printed, the UI is immediately changed to the fill-in table UI 90a, printing performed by another patient being disallowed. According to this processing, by switching the UI in response to user login, the above-mentioned problem is avoided. Unless a patient who performs printing logs in, the fill-in table UI 90 is displayed on the UI section 46, and thus printing performed by the patient is allowed. It should be noted that this processing executed by the relay device 20 may be executed by the administration device 70. In this case, the printing completion information and the user ID are transmitted to the administration device 70 through the relay device 20, and are stored in the storage section 76 of the administration device 70. When the user logs into the image forming device 40, the user ID is transmitted to the administration device 70 through the relay device 20. When the printing completion information associated with the user ID is stored in the storage section 76, the information of the fill-in table UI 90a is transmitted to the image forming device 40, and the fill-in table UI 90a is displayed on the image forming device 40.

It should be noted that the fill-in table UI shown in FIGS. 5A and 5B is just an example. For example, in a travel agency, a questionnaire sheet or an application form may be assumed to be necessary. The questionnaire sheet or the application form may include the following contents: where a customer wants to travel; whether the customer wants to travel abroad or to travel domestically; whether the customer wants to apply for a tour; whether the customer wants to buy a ticket for transportation; and the like. In order to deal with this, data of a fill-in form corresponding to the questionnaire sheet or the application form is created in advance, and is stored in the administration device 70 and the like. Further, fill-in table UI information is created, and is stored in the administration device 70 and the relay device 20. The fill-in table UI information is for allowing a user to issue an instruction to print, scan, and transmit the fill-in table. The fill-in table UI is displayed on the image forming device 40 provided in the travel agency. As described above, the fill-in form and the fill-in table UI corresponding to a location or environment in which the image forming device 40 is provided are registered and used.

Here, registration processing of the relay device 20 for the administration device 70 will be described. The relay device 20 corresponds to a protocol for allowing the administration device 70 to remotely administer devices. The relay device 20 has a function of communicating with the administration device 70 through the protocol. As the protocol for remote administration, for example, TR-069 is known. It is apparent that a protocol other than this protocol may be used. The relay device 20 stores information which represents an address of the administration device 70. When a communication session is established between the relay device 20 and the administration device 70, the relay device 20 notifies its own identification information, that is, a relay device ID to the administration device 70 through the communication path N. Thereby, the relay device 20 is registered in the administration device 70.

Next, processing of acquiring device information and terminal information through the relay device 20 will be described. For example, the device administration section 22 transmits an acquisition request to acquire the device information to each image forming device 40 connected to the communication path Na, and transmits an acquisition request to acquire the terminal information to each terminal device 60 connected to the communication path Na. In the processing of the acquisition request, for example, the relay device 20 transmits packets to the communication path Na through multicast or broadcast. On the basis of packets sent in reply from each device on the communication path Na in response to the transmitted packets, the device administration section 22 identifies each device on the communication path Na. The packets sent in reply from each device include an address of the device and a type of the device. It should be noted that the device administration section 22 may receive packets sent in reply from other devices (for example, home appliances, and the like) on the communication path Na, and may administer the other devices.

When the image forming devices 40 and the terminal devices 60 on the communication path Na are recognized, the device administration section 22 issues a request for the device information to the image forming devices 40. Further, the device administration section 22 issues a request for the terminal information to the terminal devices 60. Such a request is issued through, for example, a simple network management protocol (SNMP).

The image forming devices 40 sends its own device information to the relay device 20. For example, each image forming device 40 has a database called management information base (MIB), thus stores its own device information in the MIB, and updates contents of the information in response to change of its own state (such as an increase in the number of output sheets). The image forming device 40 sends the device information within the MIB in response to the acquisition request sent from the relay device 20. The device administration section 22 stores the device information, which is acquired from each image forming device 40, in the storage section 24. Further, each terminal device 60 sends its own terminal information to the relay device 20, in response to the acquisition request sent from the relay device 20. The device administration section 22 stores the terminal information, which is acquired from each terminal device 60, in the storage section 24.

The relay device 20 transmits the device information of each image forming device 40 to the administration device 70. Here, the relay device 20 may transmit the device information in association with its own relay device ID.

The administration section 72 of the administration device 70 stores the device information of each image forming device 40, which is received from the relay device 20, in the storage section 76 in association with the relay device ID. Thereby, the image forming devices 40 included in the administration units 10 are registered in the administration device 70. As described above, the administration device 70 recognizes names or model names of the image forming devices 40 which are present on the same communication path Na as the relay device 20, and registers information thereof. Further, if the device information of each image forming device 40 transmitted from the relay device 20 includes information pieces such as a use history and a device state, the information pieces are also stored in the storage section 76 of the administration device 70.

Through the above-mentioned processing, the relay device 20, which is provided in each administration unit 10, is registered in the administration device 70 in association with an administrator. After the registration, by logging into the administration device 70, the administrator accesses states of the image forming devices 40 within the administration unit 10.

The relay device 20 acquires the device information from each image forming device 40, for example, periodically, and acquires the terminal information from each terminal device 60. Further, when a predetermined event occurs, each image forming device 40 may send information, which represents occurrence of the event, to the relay device 20. Examples of the event of the notification target include: change in a state of consumables such as running out of paper and running out of toner; occurrence of failure in the image forming device 40; and the like. The relay device 20 transmits the information pieces, which are collected from the image forming devices 40 in such a manner, to the administration device 70, autonomously, or in response to a request issued from the administration device 70.

The administration device 70 may have a function of updating settings or a function of performing setting of the image forming devices 40 on the same communication path Na as the relay device 20 through the registered relay device 20. The information such as the setting information and the device information of the image forming device 40 is stored in, for example, the MIB held by the image forming device 40. The administration device 70 reads or writes the MIB through the relay device 20, thereby performing collection of the state information, update of the settings, and the like.

Further, the administration device 70 may have a function of updating firmware of the relay device 20 through the protocol for remote administration. When detecting update of the firmware of any one image forming device 40 within the administration units 10, the administration device 70 acquires the updated data, and may update the firmware of the image forming device 40 through the relay device 20 within the administration unit 10 on the basis of the updated data. In this case, the administration device 70 sends the updated data to the relay device 20 through the protocol for remote administration, and stores the updated data received from the relay device 20. The relay device 20 may install the stored updated data in the corresponding image forming device 40 in a push method, and may transmit the updated data in response to a download request issued from the corresponding image forming device 40. In the latter case, for example, the administration device 70 provides information to the effect that the firmware of the image forming device 40 is updated, to the administrator of the administration unit 10. For example, the information is displayed on a webpage for the administrator. The administrator who accesses the information operates the image forming device 40, whereby the updated data is downloaded from the relay device 20 to the image forming device 40, and the updated data is installed in the image forming device 40.

The administration device 70 may generate a screen (for example a webpage) which displays information of each image forming device 40 collected through the relay device 20 or information obtained by processing the collected information. When the administrator logs into the administration device 70 through the administrator terminal device 100 or the like, the screen, which displays the information, may be provided to the administrator terminal device 100 or the like. For example, the names, the model names, and the use histories of the image forming devices 40, versions of the firmware currently installed therein, and the like are displayed on the administrator terminal device 100. Further, a user interface (UI) for issuing an instruction to stop and restart using the image forming device 40 may be provided in the administrator terminal device 100. The administrator operates the UI, whereby the image forming device 40 may be set to a non-use state or a use state. For example, the stop or restart instruction is transferred to the image forming device 40 through the relay device 20 from the administration device 70.

Figure 6:
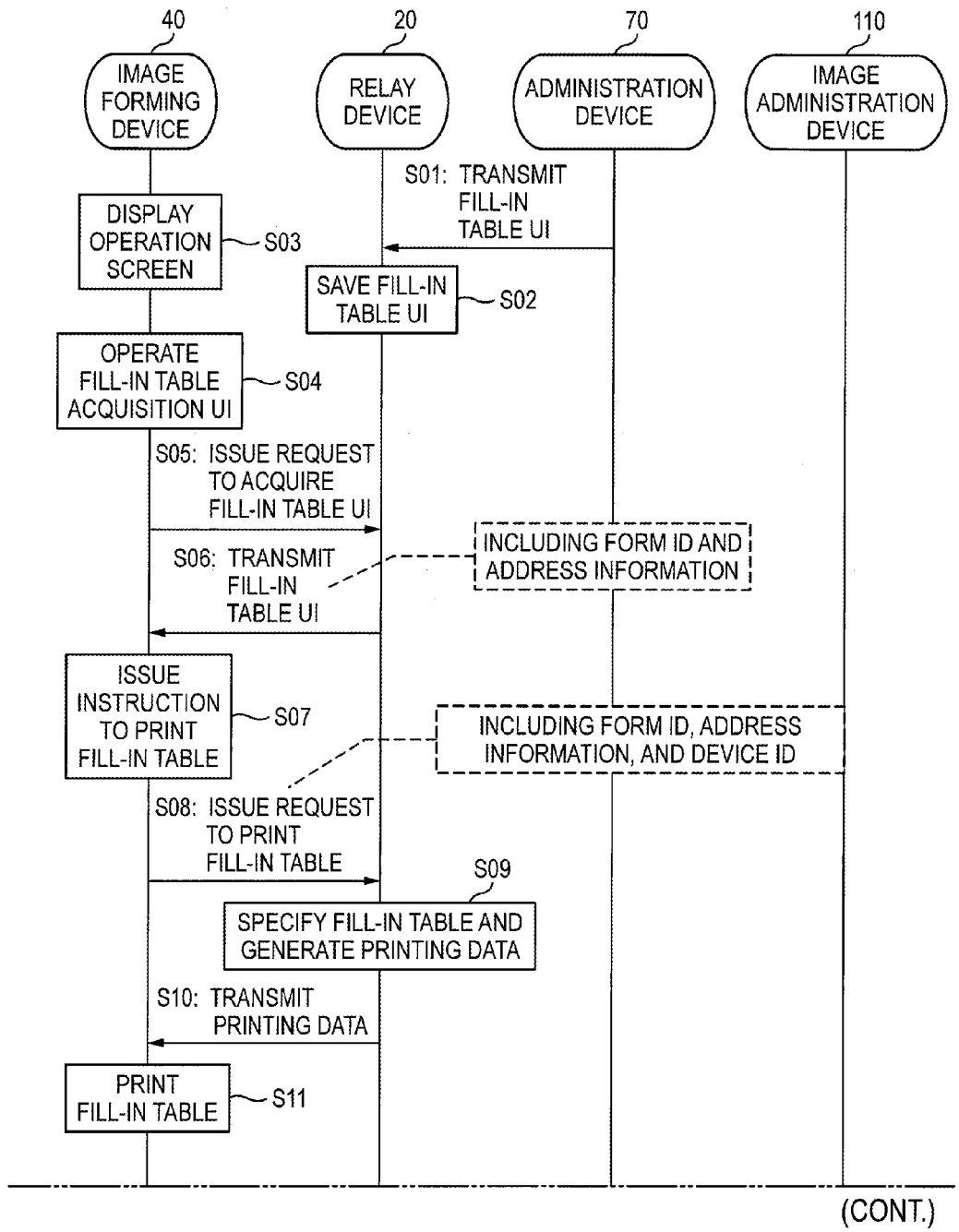
FIG. 6 is a sequence diagram illustrating processing according to a first example.

Next, referring to FIG. 6, the processing according to Example 1 will be described. Here, it is assumed that, as an exemplary fill-in table, the hospital visiting form is used. Further, it is assumed that an image forming device 40A is used.

First, the fill-in table UI information is transmitted from the administration device 70 to the relay device 20 (S01). The fill-in table UI information is stored in the storage section 24 of the relay device 20 (S02). For example, the information, which represents the fill-in table UI shown in FIGS. 5A and 5B, is transmitted from the administration device 70 to the relay device 20, and is stored in the storage section 24. Further, plural types of the fill-in table UI information pieces may be transmitted from the administration device 70 to the relay device 20, and may be stored in the relay device 20. The fill-in table UI information pieces are associated with IDs for UI.

On the other hand, the standard UI (operation screen) is displayed on the UI section 46 of the image forming device 40A (S03). The standard UI includes the extended UI display button for issuing a request to acquire the fill-in table UI information. When a user presses the extended UI display button (S04), the acquisition request to acquire the fill-in table UI information is transmitted from the image forming device 40A to the relay device 20 (S05). The UI provider portion 34 of the relay device 20 transmits the fill-in table UI information to the image forming device 40A of the acquisition request source, in response to the acquisition request (S06). The fill-in table UI information includes, for example, the printing UI information and the scanning transmission UI information. The control section 52 of the image forming device 40A causes the UI section 46 to display the fill-in table UI. For example, the fill-in table UI 90 shown in FIG. 5A is displayed. It should be noted that, in step S06, only the printing UI information may be transmitted to the image forming device 40A. In this case, only the printing UI (printing instruction button) is displayed on the UI section 46.

Next, the user presses the printing instruction button on the fill-in table UI, and an instruction to print the hospital visiting form is issued (S07). Thereby, printing request information, which represents the printing request to print the hospital visiting form, is transmitted from the image forming device 40A to the relay device 20 (S08). The printing request information includes form ID and form address information associated with the printing instruction button and a device ID of the image forming device 40A.

By referring to the form ID and the form address information included in the printing request information, the printing data generation portion 36 of the relay device 20 acquires the form ID corresponding to the hospital visiting form data from the storage location indicated by the corresponding form address information. Then, the printing data generation portion 36 generates printing data (S09). The printing data includes hospital visiting form data and information which represents a printing instruction to print the hospital visiting form data. The hospital visiting form data is data which is created or converted in accordance with a format corresponding to printing performed by the image forming device 40A. The printing data is transmitted to the image forming device 40A of the printing request source (S10).

The printing section 42 of the image forming device 40A prints the hospital visiting form on the basis of the printing data (S11). Thereby, a hospital visiting form sheet is formed. At this time, the printing section 42 prints the hospital visiting form, in accordance with the printing conditions associated with the printing instruction button. When the printing is completed, for example, the information, which represents the completion of the printing, is transmitted from the image forming device 40A to the relay device 20. When receiving the information which represents the completion of the printing, the control section 32 of the relay device 20 transmits the scanning transmission UI information to the image forming device 40A (S12). The control section 52 of the image forming device 40A displays the scanning transmission UI on the UI section 46. For example, the fill-in table UI 90a shown in FIG. 5B is displayed. It should be noted that the processing in step S12 may be omitted. In this case, the fill-in table UI 90 (the UI including the printing instruction button and the scanning transmission button) is displayed on the UI section 46 shown in FIG. 5A.

The user fills the information about a patient into the hospital visiting form sheet. Next, the completed hospital visiting form sheet is set on the image reading section 44 of the image forming device 40A. Then, when the user presses the scanning transmission button in the fill-in table UI (S13), the completed hospital visiting form sheet is scanned by the image reading section 44 (S14). At this time, the image reading section 44 scans the completed hospital visiting form in accordance with scanning conditions associated with the scanning transmission button. Thereby, the completed form image data is generated. If the number of sheets of the original document actually read by the image reading section 44 is not equal to the number of sheets included in the scanning conditions, the control section 52 of the image forming device 40A may display warning information on the UI section 46.

When the scanning is completed, the completed form image data is transmitted from the image forming device 40A to the relay device 20 (S15). For example, when the scanning for the number of sheets included in the scanning conditions is completed, the completed form image data is transmitted to the relay device 20. Storage location information associated with the scanning transmission button is attached to the completed form image data.

The relay device 20 receives the completed form image data from the image forming device 40A (S16). Next, the storage processing portion 38 of the relay device 20 transmits the completed form image data to the storage location which is indicated by the storage location information attached to the completed form image data (S17). For example, if the storage location is the administration device 70, the storage processing portion 38 transmits the completed form image data to the administration device 70 (S17). Thereby, the completed form image data is stored in the administration device 70 (S18). If the storage location is the image administration device 110, the storage processing portion 38 transmits the completed form image data to the image administration device 110 (S17). Thereby, the completed form image data is stored in the image administration device 110 (S18). In addition, if the storage location is the relay device 20, the storage processing portion 38 stores the completed form image data in the storage section 24 of the relay device 20. Further, the completed form image data may be stored in plural storage locations. For example, the completed form image data may be stored in the administration device 70 and the image administration device 110.

In a device (for example, the administration device 70) at the storage destination, the completed form image data is stored in a predetermined storage destination (for example, a folder). The storage destination may be determined in accordance with the type of the fill-in table. For example, the completed form image data of the hospital visiting form is stored in a folder for the hospital visiting forms. Further, the storage location information may include information which represents the storage destination (for example, a folder). In this case, in the device at the storage destination, the completed form image data is stored in the storage destination. The storage destination is indicated by the storage location information attached to the completed form image data. As another example, by specifying the type of the fill-in table on the basis of the completed form image data, the completed form image data may be stored in the storage destination corresponding to the type. For example, by specifying a structure of the fill-in table represented by the completed form image data, the type of the fill-in table is specified on the basis of the structure. This processing may be executed by the administration device 70, may be executed by the relay device 20, and may be executed by the image administration device 110.

As another example of step S15, the image forming device 40A may transmit the ID for the UI of the fill-in table UI information to the relay device 20, together with the completed form image data. In this case, the storage processing portion 38 of the relay device 20 specifies the fill-in table UI information corresponding to the ID for the UI in the single or plural fill-in table UI information pieces stored in the storage section 24. Then, the storage processing portion 38 specifies the storage location by referring to the storage location information associated with the scanning transmission UI information included in the fill-in table UI information. In step S17, the storage processing portion 38 stores the completed form image data in the storage location.

As described above, the fill-in table UI information is transmitted from the relay device 20 to the image forming device 40, and the fill-in table UI is displayed on the image forming device 40. Then, the hospital visiting form is printed in accordance with the printing conditions associated with the fill-in table UI. Further, an image of the completed hospital visiting form is read in accordance with the scanning conditions associated with the fill-in table UI, and the completed form image data is stored in the storage location according to the scanning conditions. According to the present embodiment, after the hospital visiting form is printed, even when the processing for the completed form image data is changed, the fill-in table UI information is changed in accordance with the change, and is stored in the relay device 20, and the processing is executed in accordance with the changed conditions. For example, by changing the scanning conditions associated with the scanning transmission instruction button in accordance with the change of the processing, the scanning processing is executed in accordance with the changed conditions. For example, when the storage location of the completed form image data is changed after the printing, the storage location information included in the scanning conditions is changed, the completed form image data being stored in the storage location after the change. It is apparent that, when the conditions about the printing are changed, the fill-in table UI information is changed in accordance with the change, and may be stored in the relay device 20. For example, the printing conditions associated with the printing instruction button may be changed. In this case, the hospital visiting form is printed in accordance with the changed printing conditions.

Even when one relay device 20 administers plural image forming devices 40, by storing the fill-in table UI information in one relay device 20, the fill-in table UI can be used in these plural image forming devices 40.

By associating the fill-in table UI with the scanning conditions, the scanning is performed on the basis of scanning parameters appropriate for each fill-in table. Further, it is possible to reduce effort of the user when selecting scanning parameters.

Further, by associating the fill-in table UI with the number of sheets subjected to image reading, the completed form image data, for which the number of read sheets is just enough, is generated. Furthermore, by making the number of sheets subjected to image reading equal to the number of printed sheets, the completed form image data, which corresponds to the number of images equal to the number of printed sheets, is generated.

In addition, the image forming device 40A acquires the fill-in table data corresponding to the form ID from the storage location which is indicated by the form address information associated with the printing instruction button.

Figure 7:
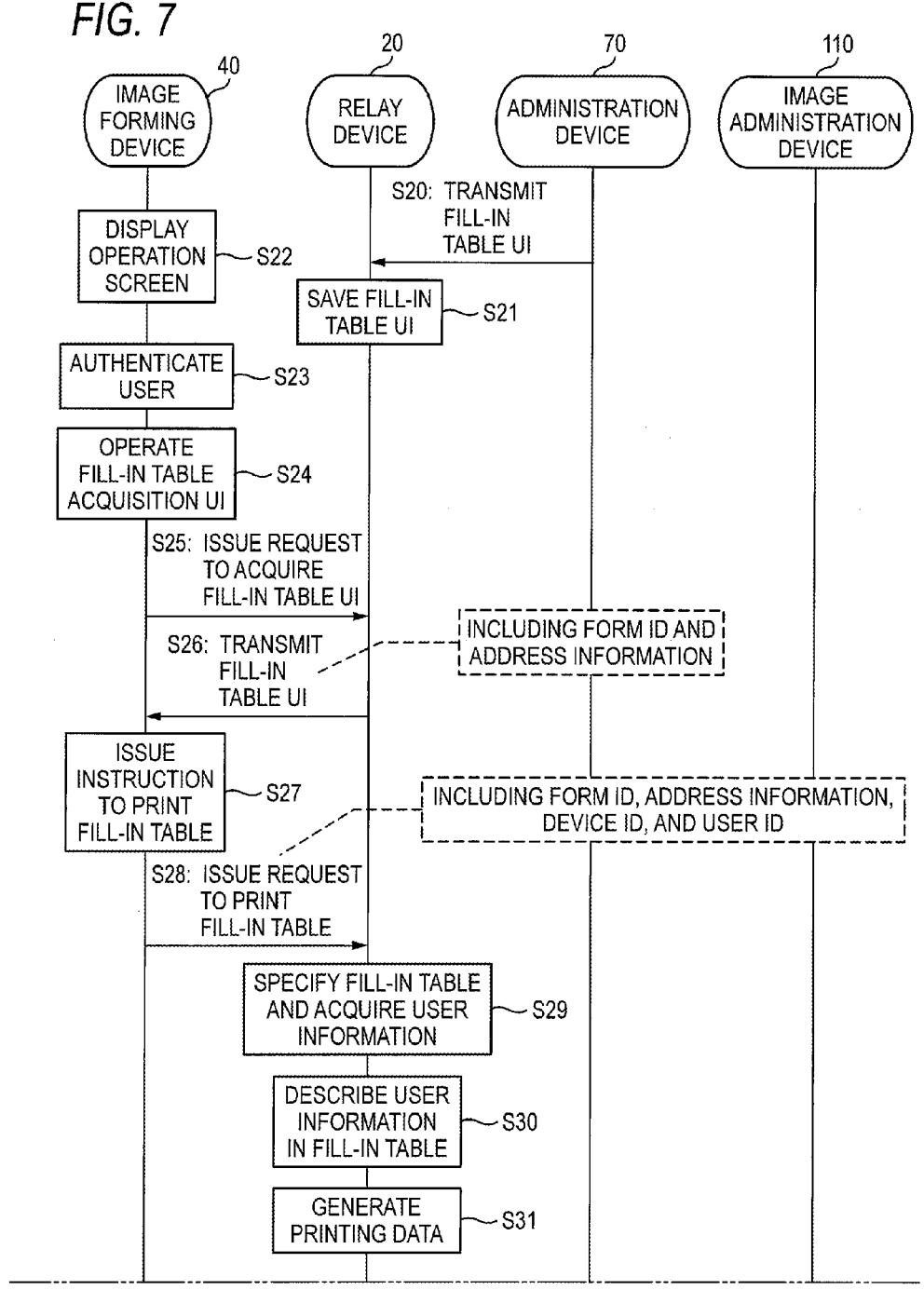
FIG. 7 is a sequence diagram illustrating processing according to a second example.

Next, referring to FIG. 7, the processing according to Example 2 will be described. Here, it is assumed that, as an exemplary fill-in table, the hospital visiting form is used. Further, it is assumed that an image forming device 40A is used. In Example 2, the user authentication processing is executed, and information used in the processing is described in the fill-in table data. Hereinafter, specific processing of Example 2 will be described.

In a manner similar to that of Example 1, the fill-in table UI information is transmitted from the administration device 70 to the relay device 20 (S20), and is stored in the storage section 24 of the relay device 20 (S21). Further, in a manner similar to that of Example 1, the standard UI (operation screen) is displayed on the UI section 46 of the image forming device 40A (S22).

In Example 2, the user authentication processing in the image forming device 40A is executed (S23). For example, a user inputs the authentication information (for example, a user ID and a password) by using the UI section 46. The authentication section 50 of the image forming device 40A performs the authentication processing on the basis of the authentication information. In addition, the authentication processing may be executed by the relay device 20, may be executed by the administration device 70, and may be executed by another external device such as an authentication server. When the authentication is successful, the user is allowed to use the image forming device 40A. It should be noted that the authentication processing may be performed using an authentication card in which the authentication information is recorded, and biometric authentication may be performed.

Next, when the user presses the extended UI display button (S24), the acquisition request to acquire the fill-in table UI information is transmitted from the image forming device 40A to the relay device 20 (S25). In response to the acquisition request, the fill-in table UI information is transmitted to the image forming device 40A (S26). For example, the fill-in table UI 90 shown in FIG. 5A is displayed on the UI section 46 of the image forming device 40A. It should be noted that only the printing UI information may be transmitted to the image forming device 40A, and only the printing UI may be displayed on the UI section 46.

Next, the user presses the printing instruction button on the fill-in table UI, and thereby an instruction to print the hospital visiting form is issued (S27). Thereby, printing request information, which represents the printing request to print the hospital visiting form, is transmitted from the image forming device 40A to the relay device 20 (S28). The printing request information includes form ID and form address information associated with the printing instruction button, a device ID of the image forming device 40A, and a user ID. The user ID is information which is input in order to perform the authentication processing. It should be noted that the form ID and the form address information are recorded in an authentication card. In this case, when the authentication card is read by the card reading device, not only the authentication information but also the form ID and the form address information are also input to the image forming device 40A. The form ID and the form address information may be included in the printing request information.

The printing data generation portion 36 of the relay device 20 acquires the hospital visiting form data, on the basis of the form ID and the form address information included in the printing request information (S29). Further, the control section 32 of the relay device 20 acquires the user information corresponding to the user ID included in the printing request information (S29). The user information includes, for example, a user's name, an age, contact information such as an address, a phone number, and an e-mail address, and the like. Further, the user information may also include information about a patient (such as symptoms and names of drugs). The user information may be stored in the storage section 48 of the image forming device 40A, may be stored in the storage section of the relay device 20, may be stored in the storage section of the administration device 70, and may be stored in another external device. The control section 32 of the relay device 20 acquires the user information corresponding to the user ID from the device in which the user information is stored. When the user information is recorded in the authentication card, by reading the authentication card, the user information is input to the image forming device 40A. In this case, the control section 32 of the relay device 20 acquires the user information from the image forming device 40A. Then, the printing data generation portion 36 makes the user information described in the hospital visiting form data (S30). For example, the printing data generation portion 36 gives descriptions of information pieces included in the user information. The respective information pieces are a name field, an age field, an address field, a contact information field, and the like in the hospital visiting form. Then, the printing data generation portion 36 generates the printing data, on the basis of the hospital visiting form data in which the user information is described (S31). The printing data includes the hospital visiting form data, in which the user information is described, and information which represents a printing instruction to print the hospital visiting form data. The hospital visiting form data is data which is created or converted in accordance with a format corresponding to the printing performed by the image forming device 40A. The printing data is transmitted to the image forming device 40A of the printing request source (S32). It should be noted that the user information may be described in the hospital visiting form data not through the relay device 20 but through the image forming device 40A.

The printing section 42 of the image forming device 40A prints a hospital visiting form into which the user information is filled, on the basis of the printing data (S33). Thereby, a hospital visiting form sheet is formed. At this time, the printing is executed in accordance with the printing conditions associated with the printing instruction button. The user information has been filled into the hospital visiting form sheet, already.

When the printing is completed, for example, the information, which represents the completion of the printing, is transmitted from the image forming device 40A to the relay device 20. In response to the information which represents the completion of the printing, the scanning transmission UI information is transmitted from the relay device 20 to the image forming device 40A (S34). The scanning transmission UI is displayed on the UI section 46 of the image forming device 40A. For example, the fill-in table UI 90a shown in FIG. 5B is displayed. It should be noted that the processing in step S34 may be omitted. In this case, the fill-in table UI 90 shown in FIG. 5A is displayed on the UI section 46.

The user fills information into blank fields in the hospital visiting form sheet. Next, the completed hospital visiting form sheet is set on the image reading section 44 of the image forming device 40A. Then, when the user presses the scanning transmission button in the fill-in table UI (S35), the completed hospital visiting form sheet is scanned by the image reading section 44 (S36). Thereby, the completed form image data is generated. At this time, the scanning is executed in accordance with the scanning conditions associated with the scanning transmission button. In a manner similar to that of Example 1, on the basis of the number of sheets of the read original document, the warning information may be output.

When the scanning is completed, the completed form image data is transmitted from the image forming device 40A to the relay device 20 (S37). For example, when the scanning for the number of sheets included in the scanning conditions is completed, the completed form image data is transmitted to the relay device 20. The storage location information and the user ID are attached to the completed form image data.

The relay device 20 receives the completed form image data from the image forming device 40A (S38). Next, the storage processing portion 38 of the relay device 20 transmits the completed form image data to the storage location which is indicated by the storage location information attached to the completed form image data (S39). For example, if the storage location is the administration device 70, the storage processing portion 38 transmits the completed form image data to the administration device 70 (S39). The completed form image data is stored in a storage destination (for example, a folder) corresponding to the user ID, in the administration device 70 (S40). If the storage location is the image administration device 110, the completed form image data is transmitted to the image administration device 110 (S39). The completed form image data is stored in a storage destination (for example, a folder) corresponding to the user ID, in the image administration device 110 (S40).

As described above, in Example 2, the hospital visiting form, into which the user information is filled, is printed. Thereby, it is possible to reduce effort of the user (patient) when filling the user information into the hospital visiting form.

When the user information includes the e-mail address of the user, various kinds of information may be transmitted to the e-mail address as a destination. For example, the hospital visiting form data may be transmitted, information indicating that the completed form image data is stored in the storage destination may be transmitted, and the completed form image data may be transmitted. For example, through the e-mail, various kinds of information are transmitted.

Next, referring to FIG. 8, the processing according to Example 3 will be described. Here, it is assumed that, as an exemplary fill-in table, the hospital visiting form is used. In Example 3, it is assumed that image forming devices 40A and 40B are used. Here, the image forming device 40A is used as a printer, and the image forming device 40B is used as a scanner. Further, the user authentication processing is executed, and information used in the processing is described in the fill-in table data. Hereinafter, specific processing of Example 3 will be described.

In a manner similar to that of Example 1, the fill-in table UI information is transmitted from the administration device 70 to the relay device 20 (S50), and is stored in the storage section 24 of the relay device 20 (S51). Further, in a manner similar to that of Example 1, the standard UI (operation screen) is displayed on the UI section 46 of the image forming device 40A (S52).

In a manner similar to that of Example 2, the user authentication processing in the image forming device 40A is executed (S53). Since contents of the authentication processing are the same as the contents of Example 2, the description thereof will be omitted. When the authentication is successful, the user is allowed to use the image forming device 40A.

Next, when the user presses the extended UI display button (S54), the acquisition request to acquire the fill-in table UI information is transmitted from the image forming device 40A to the relay device 20 (S55). In response to the acquisition request, the fill-in table UI information is transmitted to the image forming device 40A (S56). The fill-in table UI information includes the printing UI information. The printing UI (printing instruction button) is displayed on the UI section 46 of the image forming device 40A. The fill-in table UI information may include the scanning transmission UI information. In this case, the printing UI (printing instruction button) and the scanning transmission UI (scanning transmission instruction button) may be displayed on the UI section 46. It should be noted that, in Example 3, the scanning transmission processing is not executed in the image forming device 40A (printer), and thus the scanning transmission UI information does not have to be transmitted to the image forming device 40A.

Next, the user presses the printing instruction button, whereby an instruction to print the hospital visiting form is issued (S57). Thereby, the printing request to print the hospital visiting form is transmitted from the image forming device 40A to the relay device 20 (S58). The printing request information includes form ID and form address information associated with the printing instruction button, a device ID of the image forming device 40A, and a user ID. The user ID is information which is input in order to perform the authentication processing. It should be noted that the form ID and the form address information are recorded in an authentication card. In this case, when the authentication card is read by the card reading device, not only the authentication information but also the form ID and the form address information are also input to the image forming device 40A. The form ID and the form address information may be included in the printing request information.

The printing data generation portion 36 of the relay device 20 acquires the hospital visiting form data, on the basis of the form ID and the form address information included in the printing request information (S59). Further, in a manner similar to that of Example 2, the control section 32 of the relay device 20 acquires the user information corresponding to the user ID included in the printing request information (S59). Since the user information is the same as the user information according to Example 2, the description thereof will be omitted. In a manner similar to that of Example 2, the user information is described in the hospital visiting form data (S60), and the printing data is generated on the basis of the hospital visiting form data described by the user information (S61). The printing data includes the hospital visiting form data, in which the user information is described, and information which represents a printing instruction to print the hospital visiting form data. The hospital visiting form data is data which is created or converted in accordance with a format corresponding to printing performed by the image forming device 40A. The printing data is transmitted to the image forming device 40A of the printing request source (S62). It should be noted that the user information may be described in the hospital visiting form data not by the relay device 20 but by the image forming device 40A.

The printing section 42 of the image forming device 40A prints the hospital visiting form into which the user information is filled, on the basis of the printing data (S63). Thereby, a hospital visiting form sheet, into which the user information is filled, is formed. At this time, the printing is executed in accordance with the printing conditions associated with the printing instruction button.

When the printing is completed, the control section 52 of the image forming device 40A transmits the printing completion information and the user ID to the relay device 20. The printing completion information represents a state where the hospital visiting form is completely printed. In the storage section 24 of the relay device 20, the printing completion information and the user ID are stored in association with each other.

Next, the user logs into the image forming device 40B (scanner) different from the image forming device 40A. For example, the user authentication processing in the image forming device 40B is executed (S64). The authentication processing is the same as the processing of Example 2 or step S53. When the authentication is successful, the user is allowed to use the image forming device 40B.

In Example 3, the control section 52 of the image forming device 40A transmits the user ID to the relay device 20. The user ID is an ID used in the user authentication processing of step S64. When the printing completion information associated with the user ID is stored in the storage section 24 of the relay device 20, the control section 32 of the relay device 20 transmits the scanning transmission UI information to the image forming device 40B (S65). Thereby, the scanning transmission UI is displayed on the UI section 46 of the image forming device 40B. For example, the information, which represents the fill-in table UI 90a shown in FIG. 5B, is transmitted to the image forming device 40B, and the fill-in table UI 90a is displayed on the UI section 46 of the image forming device 40B. The situation, in which the printing completion information corresponding to the user ID has been stored in the relay device 20, means that the hospital visiting form has been printed already. Accordingly, the scanning transmission UI information is transmitted to the image forming device 40B on which log-in processing based on the user ID is executed. The scanning transmission UI information is for an instruction to perform the scanning transmission processing as subsequent processing. Thereby, contents of the processing to be executed after the printing are presented to the user. When the printing completion information associated with the user ID is not stored in the relay device 20, error processing is executed, and thus the scanning transmission UI information is not transmitted to the image forming device 40B. In this case, the scanning transmission UI is not displayed on the image forming device 40B. In addition, in this case, when the image forming device 40B has a printing function, the printing UI information may be transmitted from the relay device 20 to the image forming device 40B. In this case, the printing UI is displayed on the image forming device 40B, and printing of the hospital visiting form performed by the image forming device 40B is allowed. It should be noted that the processing executed by the relay device 20 may be executed by the administration device 70. In this case, the printing completion information and the user ID are transmitted to the administration device 70 through the relay device 20, and are stored in the storage section 76 of the administration device 70. When the user logs into the image forming device 40B, the user ID is transmitted to the administration device 70 through the relay device 20. When the printing completion information associated with the user ID is stored in the storage section 76, the information of the fill-in table UI 90a is transmitted to the image forming device 40B.

The user fills information into blank fields in the hospital visiting form sheet. Next, the completed hospital visiting form sheet is set on the image reading section 44 of the image forming device 40B. Then, when the user presses the scanning transmission instruction button in the scanning transmission UI (S66), the completed hospital visiting form sheet is scanned by the image reading section 44 (S67). Thereby, the completed form image data is generated. At this time, the scanning is executed in accordance with the scanning conditions associated with the scanning transmission instruction button. It should be noted that, on the basis of the number of sheets of the read original document, the warning information may be output.

When the scanning is completed, the completed form image data is transmitted from the image forming device 40B to the relay device 20 (S68). For example, when the scanning for the number of sheets included in the scanning conditions is completed, the completed form image data is transmitted to the relay device 20. The storage location information and the user ID are attached to the completed form image data.

The relay device 20 receives the completed form image data from the image forming device 40A (S69). Next, the storage processing portion 38 of the relay device 20 transmits the completed form image data to the storage location which is indicated by the storage location information attached to the completed form image data (S70). For example, if the storage location is the administration device 70, the storage processing portion 38 transmits the completed form image data to the administration device 70 (S70). The completed form image data is stored in a storage destination (for example, a folder) corresponding to the user ID, in the administration device 70 (S71). In a manner similar to that of Example 2, the completed form image data may be stored in the storage destination (for example, a folder) corresponding to the user ID, in the image administration device 110.

As described above, in Example 3, the hospital visiting form is printed by the image forming device 40A, and an image of the completed hospital visiting form is read by the image forming device 40B different from the image forming device 40A. As described above, even when the printing and the scanning are executed in different devices, it is possible to obtain the same effect as in Example 1. Further, in a manner similar to that of Example 2, the hospital visiting form, into which the user information is filled, is printed. Thereby, it is possible to reduce effort of the user when inputting information.

Figure 9:
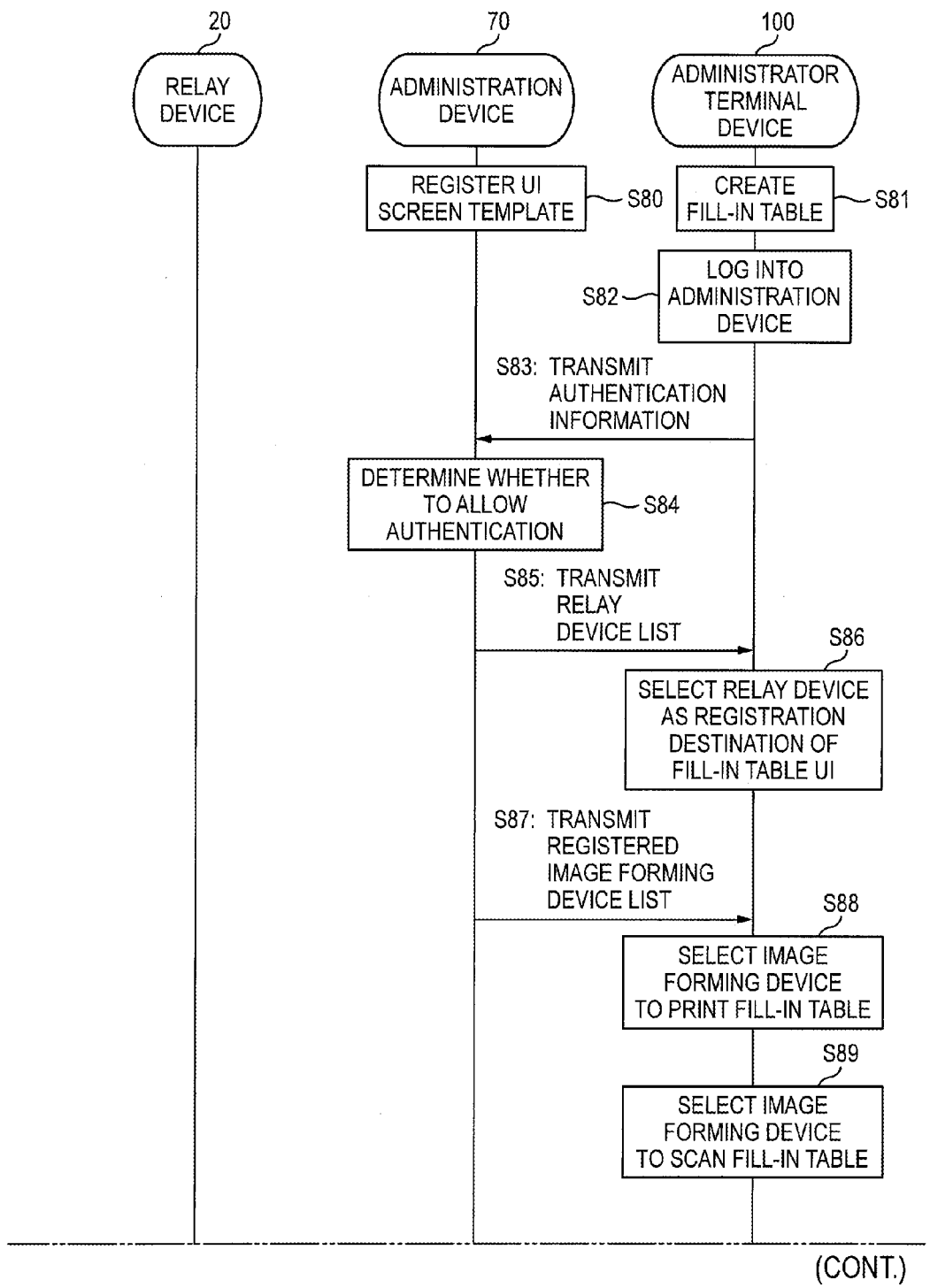
FIG. 9 is a sequence diagram illustrating processing according to a fourth example.

Next, referring to FIG. 9, the processing according to Example 4 will be described. In Example 4, the fill-in table is registered in the administration device 70. For example, it is assumed that the fill-in table is created by using the administrator terminal device 100. In addition, it is assumed that, as an exemplary fill-in table, the hospital visiting form is used.

The storage section 76 of the administration device 70 stores template information of the fill-in table UI (S80). The template information is information used in order to create a new fill-in table UI. For example, a template of the printing instruction button and a template of the scanning transmission instruction button are registered.

First, an administrator creates the hospital visiting form by using the administrator terminal device 100 (S81). Further, the administrator designates the storage location of data of the hospital visiting form. The storage location may be the relay device 20, may be the administration device 70, and may be another device.

Next, the administrator logs into the administration device 70 by using the administrator terminal device 100 (S82). For example, when the administrator accesses the administration device 70 by using the administrator terminal device 100, a log-in screen is provided from the administration device 70 to the administrator terminal device 100. When the administrator inputs the authentication information (for example, a user ID and a password) on the log-in screen, the authentication information is transmitted from the administrator terminal device 100 to the administration device 70 (S83). The authentication processing is performed by the authentication section 82 of the administration device 70 (S84). When the authentication is successful, the logging into the administration device 70 is allowed.

Next, data of the relay device list is transmitted from the administration device 70 to the administrator terminal device 100 (S85). The relay device list is a list representing single or plural relay devices 20 which are registered in the administration device 70. The list includes, for example, relay device IDs.

The relay device list is displayed on the display section of the administrator terminal device 100. The administrator selects the relay device 20 as a registration destination of the fill-in table UI information from the single or plural relay devices 20 represented in the relay device list, by using the administrator terminal device 100 (S86).

Further, data of the registered image forming device list is transmitted from the administration device 70 to the administrator terminal device 100 (S87). The registered image forming device list is a list representing single or plural image forming devices 40 registered in the administration device 70. The list includes, for example, device IDs.

The registered image forming device list is displayed on the display section of the administrator terminal device 100. The administrator selects the image forming device 40, which is allowed to print the hospital visiting form, from the single or plural image forming devices 40 represented in the registered image forming device list, by using the administrator terminal device 100 (S88). The administrator selects, for example, the image forming device 40, which is allowed to print the hospital visiting form, for each administration unit 10. Further, the administrator sets the printing conditions of the hospital visiting form, by using the administrator terminal device 100

Further, the administrator selects the image forming device 40, which is allowed to scan the completed hospital visiting form sheet, from the single or plural image forming devices 40 represented in the registered image forming device list, by using the administrator terminal device 100 (S89). In addition, the administrator may select the image forming device 40, which is the same as the image forming device 40 allowed to perform printing, as the image forming device 40 which is allowed to perform scanning. The administrator may select an image forming device 40, which is different from the image forming device 40 allowed to perform printing, as the image forming device 40 which is allowed to perform scanning. For example, if the printer and the scanner are different devices, the printer and the scanner are separately selected. Further, the administrator sets the scanning conditions of the completed hospital visiting form sheet, by using the administrator terminal device 100.

The administrator designates the storage location of the completed form image data, by using the administrator terminal device 100 (S90). As the storage location, for example, the relay device 20, the administration device 70, another device, or the like is designated. Further, an e-mail address of the administrator or a specific user may be designated as the storage location. Plural storage locations may be designated.

When the administrator issues a registration instruction by using the administrator terminal device 100 (S91), various kinds of information, which are set in the administrator terminal device 100, are transmitted from the administrator terminal device 100 to the administration device 70 (S92). Specifically, from the administrator terminal device 100 to the administration device 70, the following information pieces are transmitted: the relay device ID which represents the relay device 20 of the registration destination of the fill-in table UI; the hospital visiting form data; the form address information which represents the storage location of the hospital visiting form data; the device ID of the image forming device 40 which is allowed to perform printing; the printing conditions information; the device ID of the image forming device 40 which is allowed to perform scanning; scanning conditions information; and the storage location information which represents the storage location of the completed form image data.

The UI information setting portion 86 of the administration device 70 associates the printing conditions information, the form ID, and the form address information with the printing instruction button which is registered as a template (S93). Thereby, the printing UI information is created. Further, the UI information setting portion 86 associates the scanning conditions information and the storage location information with the scanning transmission instruction button which are registered as a template (S94). Thereby, the scanning transmission UI information is created. The UI information setting portion 86 creates the fill-in table UI information which includes the printing UI information and the scanning transmission UI information.

The control section 84 of the administration device 70 transmits the hospital visiting form data to the storage location indicated by the form address information. In the example shown in FIG. 9, the relay device 20 is designated as the storage location. Accordingly, the hospital visiting form data is transmitted to the relay device 20 (S95). The hospital visiting form data is stored in the storage section 24 of the relay device 20 (S96).

Next, the control section 84 of the administration device 70 transmits the fill-in table UI information (UI screen information) to the relay device 20 which is selected by the administrator (S97). The fill-in table UI information is stored in the storage section 24 of the relay device 20 (S98).

Further, the control section 84 of the administration device 70 transmits link information, which represents a link button for linking to the fill-in table UI, to the relay device 20 (S99). The control section 32 of the relay device 20 sets the link button in the standard UI (the existing UI of the image forming device 40) of the image forming device 40, which is allowed to perform printing, and the standard UI (the existing UI) of the image forming device 40 which is allowed to perform scanning (S100). For example, the information, which represents the link button, is transmitted to the image forming device 40, and the link button is registered in the standard UI.

As described above, according to Example 4, a new fill-in table UI is registered in the administration device 70 and the relay device 20. As described in Examples 1, 2, and 3, the fill-in table UI information is transmitted from the relay device 20 to the image forming device 40. Thereby, the fill-in table UI is displayed on the image forming device 40.

Plural kinds of fill-in table UIs may be registered in the administration device 70 and the relay device 20. For example, the fill-in table data and the fill-in table UI are created for each type of the fill-in table, and are thus registered in the administration device 70 or the relay device 20. Specifically, various information pieces are created, and those are registered in the administration device 70 or the relay device 20. The information pieces include the data of the hospital visiting form, the fill-in table UI information for the hospital visiting form, the data of a travel application form, and information for the fill-in table for the travel application form.

Further, use of the fill-in table UI may be allowed or disallowed in accordance with users. For example, the fill-in table UI information is associated with the user ID which is allowed to use the fill-in table UI. For example, the administrator performs the association by using the administrator terminal device 100. The fill-in table UI information associated with the user ID is stored in the storage section 24 of the relay device 20. Then, when a user logs into the image forming device 40, an ID of the user may be associated with the fill-in table UI information. In this case, the UI provider portion 34 of the relay device 20 provides the fill-in table UI information, which is associated with the user ID, to the image forming device 40. Thereby, the fill-in table UI corresponding to the user is displayed on the image forming device 40.

For example, when plural fill-in table UIs are registered, the user ID, which is allowed to be used, may be associated with each fill-in table UI. Thereby, the fill-in table UIs relating to the users who log into the image forming device 40 are displayed on the image forming device 40.

Each of the relay device 20, the image forming device 40, and the administration device 70 is implemented through, for example, combination of software and hardware resources. Specifically, each of the relay device 20, the image forming device 40, and the administration device 70 has a processor such as a CPU not shown in the drawing. The corresponding processor reads and executes a program stored in a storage device not shown in the drawing. Thereby, functions of respective sections of the relay device 20, the image forming device 40, and the administration device 70 are implemented. The program is stored in the storage device through a recording medium such as a CD or a DVD, or through a communication path such as a network. Alternatively, the respective sections of the relay device 20, the image forming device 40, and the administration device 70 may be implemented by hardware resources such as a processor or an electronic circuit. For the implementation, devices such as a memory may be used. As another example, the respective sections of the relay device 20, the image forming device 40, and the administration device 70 may be implemented by a digital signal processor (DSP), a field programmable gate array (FPGA), and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fill-in form providing device comprising:
   a transmission section that transmits information of a user interface for a fill-in form to an image forming device of an acquisition request source in response to an acquisition request to acquire the user interface for the fill-in form issued from the image forming device;
   a printing instruction section that instructs the image forming device of a printing request source to print a fill-in form associated with the user interface for the fill-in form, in response to a printing request to print the fill-in form based on an operation of the user interface for the fill-in form in the image forming device;

a reception section that receives image data, which is generated through image reading based on the operation of the user interface for the fill-in form in the image forming device, and storage destination information which represents a storage destination of the image data; and a storage processing section that executes processing for storing the image data in the storage destination.

2. The fill-in form providing device according to claim 1, wherein an image reading condition is associated with the user interface for the fill-in form, and the image reading based on the operation of the user interface for the fill-in form is executed in accordance with the image reading condition.

3. The fill-in form providing device according to claim 2, wherein the image reading condition includes a sheet number condition for the image reading.

4. The fill-in form providing device according to claim 3, wherein the number of sheets indicated by the sheet number condition is equal to the number of sheets of the fill-in form which is printed in accordance with the print instruction.

5. The fill-in form providing device according to claim 3, further comprising:

an output section that when the number of sheets of an original document read by the image forming device is not equal to the number of sheets indicated by the sheet number condition, outputs information indicating the numbers of sheets are not equal.

6. The fill-in form providing device according to claim 1, wherein the printing instruction section acquires information about a user who issues an instruction of the printing request, and issues the instruction to print the fill-in form into which the information about the user is filled.

7. The fill-in form providing device according to claim 1, wherein the user interface for the fill-in form includes a user interface for printing and a user interface for image reading, the printing request is executed on the basis of an operation of the user interface for printing, and the image reading is executed on the basis of an operation of the user interface for image reading.

8. The fill-in form providing device according to claim 7, wherein the transmission section includes a first transmission section that transmits information of the user interface for printing, to an image forming device of a first acquisition request source, in response to a first acquisition request to acquire the user interface for the fill-in form, and a second transmission section that transmits information of the user interface for image reading, to an image forming device of a second acquisition request source, in response to a second acquisition request to acquire the user interface for image reading.

9. The fill-in form providing device according to claim 8, wherein the second transmission section transmits the information of the user interface for image reading to the image forming device of the second acquisition request source in response to receiving printing completion information indicating a state where the printing of the fill-in form is completed in the image forming device.

10. The fill-in form providing device according to claim 9, further comprising:

a storage section that receives user identification information, which is for identifying the user who issues an instruction of the printing request, and the printing completion information, and stores the user identification information and the printing completion information in association with each other, wherein the second transmission section transmits the information of the user interface for image reading to the image forming device of the second acquisition request source in response to receiving the user identification information, which is stored in the storage section, from the image forming device of the second acquisition request source.

11. The fill-in form providing device according to claim 8, wherein the image forming device of the first acquisition request source is the same as the image forming device of the second acquisition request source.

12. The fill-in form providing device according to claim 8, wherein the image forming device of the first acquisition request source is different from the image forming device of the second acquisition request source.

13. An image forming device comprising:

a display control section that causes a display section to display a user interface for a fill-in form which is provided from a fill-in form providing device;

a printing request section that requests the fill-in form providing device to print the fill-in form associated with the user interface for the fill-in form in accordance with a printing instruction based on an operation of the user interface for the fill-in form;

a printing section that prints the fill-in form in accordance with an instruction to print the fill-in form corresponding to the request;

an image reading section that reads an image of an original document including the fill-in form so as to generate image data in accordance with an image reading instruction based on the operation of the user interface for the fill-in form; and a transmission section that transmits the image data and image data storage destination information, which are associated with the user interface for the fill-in form, to the fill-in form providing device.

14. The image forming device according to claim 13, wherein an image reading condition is associated with the user interface for the fill-in form, and the image reading section reads an image of the original document including the fill-in form in accordance with the image reading condition.

15. The image forming device according to claim 14, wherein the image reading condition includes a sheet number condition for the image reading, and the image reading section reads images of the number of sheets of the original document indicated by the sheet number condition.

16. The image forming device according to claim 15, wherein the number of sheets indicated by the sheet number condition is equal to the number of sheets of the fill-in form which is printed in accordance with the printing instruction.

17. The image forming device according to claim 15, further comprising:

an output section that when the number of sheets of an original document read by the image reading section is not equal to the number of sheets indicated by the sheet number condition, outputs information indicating the numbers of sheets are not equal.

18. The image forming device according to claim 13, further comprising:

a user information receiving section that receives user information,
wherein the printing section prints the fill-in form into which the received user information is filled.

19. The image forming device according to claim 13, wherein the user interface for the fill-in form includes a user interface for printing and a user interface for image reading,
the printing request section requests the fill-in form providing device to print the fill-in form in accordance with the printing instruction based on the operation of the user interface for printing,
after the fill-in form is printed by the printing section, the display control section causes the display section to display the user interface for image reading, and
the image reading section reads the image of the original document including the fill-in form in accordance with the image reading instruction based on the operation of the user interface for image reading.

20. A fill-in form providing method, comprising:
transmitting information of a user interface for a fill-in form to an image forming device of an acquisition request source in response to an acquisition request to acquire the user interface for the fill-in form issued from the image forming device;
instructing the image forming device of a printing request source to print a fill-in form associated with the user interface for the fill-in form, in response to a printing request to print the fill-in form based on an operation of the user interface for the fill-in form in the image forming device;
receiving image data, which is venerated through image reading based on the operation of the user interface for the fill-in form in the image forming device, and storage destination information which represents a storage destination of the image data; and
executing processing for storing the image data in the storage destination.

21. An image forming method, comprising:
causing a display section to display a user interface for a fill-in form which is provided from a fill-in form providing device;
requesting the fill-in form providing device to print the fill-in form associated with the user interface for the fill-in form in accordance with a printing instruction based on an operation of the user interface for the fill-in form;
printing the fill-in form in accordance with an instruction to print the fill-in form corresponding to the request;
reading an image of an original document including the fill-in form so as to generate image data in accordance with an image reading instruction based on the operation of the user interface for the fill-in form; and
transmitting the image data and image data storage destination information, which are associated with the user interface for the fill-in form, to the fill-in form providing device.

22. A non-transitory computer readable medium storing a program causing a computer to execute a process for fill-in form providing, the process comprising:
transmitting information of a user interface for a fill-in form to an image forming device of an acquisition request source in response to an acquisition request to acquire the user interface for the fill-in form issued from the image forming device;
instructing the image forming device of a printing request source to print a fill-in form associated with the user interface for the fill-in form, in response to a printing request to print the fill-in form based on an operation of the user interface for the fill-in form in the image forming device;
receiving image data, which is generated through image reading based on the operation of the user interface for the fill-in form in the image forming device, and storage destination information which represents a storage destination of the image data; and
executing processing for storing the image data in the storage destination.

23. A non-transitory computer readable medium storing a program causing a computer to execute a process for image forming, the process comprising:
causing a display section to display a user interface for a fill-in form which is provided from a fill-in form providing device;
requesting the fill-in form providing device to print the fill-in form associated with the user interface for the fill-in form in accordance with a printing instruction based on an operation of the user interface for the fill-in form:
printing the fill-in form in accordance with an instruction to print the fill-in form corresponding to the request;
reading an image of an original document including the fill-in form so as to generate image data in accordance with an image reading instruction based on the operation of the user interface for the fill-in form; and
transmitting the image data and image data storage destination information, which are associated with the user interface for the fill-in form, to the fill-in form providing device.

* * * * *